(12) United States Patent
Takano

(10) Patent No.: US 7,600,119 B2
(45) Date of Patent: Oct. 6, 2009

(54) DATA UPDATE SYSTEM, DATA UPDATE METHOD, DATA UPDATE PROGRAM, AND ROBOT SYSTEM

(75) Inventor: Yosuke Takano, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 10/591,766

(22) PCT Filed: Dec. 24, 2004

(86) PCT No.: PCT/JP2004/019332

§ 371 (c)(1),
(2), (4) Date: Sep. 1, 2006

(87) PCT Pub. No.: WO2005/085973

PCT Pub. Date: Sep. 15, 2005

(65) Prior Publication Data

US 2007/0203685 A1    Aug. 30, 2007

(30) Foreign Application Priority Data

Mar. 4, 2004   (JP)   .............................. 2004-060587
Sep. 8, 2004   (JP)   .............................. 2004-260679

(51) Int. Cl.
*H04L 9/00* (2006.01)
*H04L 9/32* (2006.01)
*G06F 11/30* (2006.01)

(52) U.S. Cl. ...................... 713/168; 713/169; 713/170; 713/171; 713/172; 713/173; 726/2; 726/3; 726/4; 726/5; 726/6; 726/27; 726/28; 726/29; 726/30

(58) Field of Classification Search ................. 713/168
See application file for complete search history.

(56) References Cited

U.S. PATENT DOCUMENTS 6,799,277 B2 * 9/2004 Colvin ........................ 726/22

(Continued)

FOREIGN PATENT DOCUMENTS

JP    08-190472 A    7/1996

(Continued)

OTHER PUBLICATIONS

NEC Personal Robot Research Center, "NEC's Robot Technology", NEC Corporation, 2003, retrieved Feb. 20, 2004, Internet URL: http://www.nec.co.jp/robot/sikumi/01.html.

*Primary Examiner*—Longbit Chai
(74) *Attorney, Agent, or Firm*—Sughrue Mion, PLLC

(57) ABSTRACT

A sub system (110) included in a robot that executes a program for performing a predetermined function includes a data receiving unit (115) that receives expansion data that expands the function of the robot, a data incorporation unit (116) that incorporates the received expansion data, a password output unit (113) that outputs a password corresponding to a predetermined condition, and a server sub system (100) that provides a plurality of expansion data includes a terminal communication unit (101) that accepts an input of the password by a user, an option presentation unit (125) that obtains the plurality of expansion data corresponding to the accepted password and presents to the user, a data selection unit (104) that accepts a selection of the user, and a data transmission unit (106) that transmits the selected expansion data to the robot sub system (110).

23 Claims, 15 Drawing Sheets

U.S. PATENT DOCUMENTS

| | | | |
|---|---|---|---|
| 6,928,558 B1 * | 8/2005 | Allahwerdi et al. | 726/9 |
| 2002/0106081 A1 * | 8/2002 | Yang | 380/201 |
| 2003/0191952 A1 * | 10/2003 | Anderson et al. | 713/189 |

FOREIGN PATENT DOCUMENTS

| | | |
|---|---|---|
| JP | 11-194937 A | 7/1999 |
| JP | 11-258985 A | 9/1999 |
| JP | 2000-347846 A | 12/2000 |
| JP | 2001-209614 A | 8/2001 |
| JP | 2001-250045 A | 9/2001 |
| JP | 2002-120179 A | 4/2002 |
| JP | 2002-140532 A | 5/2002 |
| JP | 2003-122588 A | 4/2003 |
| JP | 2003-255991 A | 9/2003 |
| JP | 2003-271256 A | 9/2003 |
| JP | 2004-008270 * | 1/2004 |
| JP | 2004-008270 A | 1/2004 |
| WO | WO 00/43867 A | 7/2000 |

* cited by examiner

FIG. 5

| UTILIZATION TIME | PASSWORD IDENTIFIER |
|---|---|
| 2 | " STAGE 1 " |
| 10 | " STAGE 2 " |
| 24 | " STAGE 3 " |

FIG. 6

| PASSWORD IDENTIFIER | PASSWORD |
|---|---|
| " STAGE 1 " | " BLUE SKY " |
| " STAGE 2 " | " WHITE CLOUD " |
| " STAGE 3 " | " RED SUNSET " |

| PARAMETER NAME | PASSWORD IDENTIFIER |
|---|---|
| "GAME CLEAR" | "ADD GAME" |
| "SAW ALL DANCES" | "ADD DANCE" |
| "TALKED ALL TOPICS" | "ADD CONVERSATION" |

| PASSWORD IDENTIFIER | DATA CAPACITY | PASSWORD |
|---|---|---|
| "STAGE 1" | "SUFFICIENT" | "BLUE SKY" |
| "STAGE 2" | "SUFFICIENT" | "WHITE CLOUD" |
| "STAGE 3" | "SUFFICIENT" | "RED SUNSET" |
| "STAGE 1" | "SCARCE" | "DARK NIGHT" |
| "STAGE 2" | "SCARCE" | "BRIGHT MORNING" |
| "STAGE 3" | "SCARCE" | "DISTANT STAR" |

DATA UPDATE SYSTEM, DATA UPDATE METHOD, DATA UPDATE PROGRAM, AND ROBOT SYSTEM

This application claims priority from PCT Application No. PCT/JP2004/019332 filed Dec. 24, 2004, and from Japanese Patent Application Nos. 2004-060587 and 2004-260679 filed Mar. 4, 2004 and Sep. 8, 2004, respectively, which applications are incorporated herein by reference.

TECHNICAL FIELD

The present invention relates to a system and method of data update, with respect to data for execution of a predetermined function.

BACKGROUND ART

Patented document 1 discloses an example of a system in which a robot grows by modifying a function or adding a function according to its internal status, to provide a user with higher affinity and satisfaction, to thereby upgrade the amusing performance as a robot. In this relation, a technique of transferring data including a program to the robot from a remote server computer via a network to add the function is known as a method of modifying or adding the function, and an example of the conventional system is described in patented document 2.

The system employs a means by which the user selects data to be incorporated according to his/her taste from the server computer selling the data; the selected data is transferred to a personal terminal of the user via the network; and the user further transfers the data to an external memory such as a memory card, and inserts the memory in the robot thus to incorporate the data. This conventional example cannot be applied to the purpose of spontaneous modification of the function by the robot represented by the growth, because the type of the data to be newly incorporated into the robot and the timing for the incorporation are determined by the user of the robot.

Another conventional example is found in patented document 3, which discloses a system of transferring new data from the server computer to the robot without the intermediation of the user. In such conventional example, the type of the data to be newly incorporated into the robot and the timing for the incorporation are determined by the program incorporated in the robot, and therefore the system is applicable to a purpose such as the growth.

However, when the growth can be branched into a plurality of option according to the utilization status of the user, making the robot grow only with the program incorporated in the robot according to the method provided by the patented document 3 is not effective. It is because the option of growth selected by the program in the robot may not be in accordance with the robot user's taste, because the user's taste is not taken into consideration, unlike the system of the patented document 2. In this case, the user may significantly lose affection for the robot.

Such problem may also arise from the determination of the timing for the growth. According to the manner of the patented document 3, the timing for the growth is exclusively determined by the program installed in the robot, and hence the growth is executed regardless of the user's intention, even though the user loves the current state and wants to postpone the growth. Thus, the conventional techniques are unable to involve both of the program of the robot and the intention of the user, in determining the orientation and timing for the growth.

[Patented document 1] Japanese Laid-Open Patent Publication Tokkai No. 2000-350275 (Abstract)
[Patented document 2] Japanese Laid-Open Patent Publication Tokkai No. 2001-250045 (p. 22, FIG. 17)
[Patented document 3] Japanese Laid-Open Patent Publication Tokkai No. 2003-255991 (p. 6, FIG. 9)
[Non-patented document 1] NEC Personal Robot Research Center, "NEC's robot technology", [online], 2003, NEC Corporation, retrieved on Feb. 20, 2004, Internet URL: http://www.incx.nec.co.jp/robot/sikumi/01.html

DISCLOSURE OF THE INVENTION

In the conventional system, however, when the growth can be branched into a plurality of options, in an apparatus including a robot that executes a function based on data including a program, and that modifies the function or adds a function thus to grow, the type of the data including the program to be incorporated into the apparatus cannot be determined with the involvement of both the program incorporated into the apparatus and the user of the apparatus, and such idea has not been even conceived.

In the conventional system, besides, the timing to incorporate the data including the program into the apparatus cannot be determined with the involvement of both the program incorporated into the apparatus and the user of the apparatus.

The present invention has been conceived in view of the foregoing situation, with an object to provide a data update system capable of expanding data for execution of a predetermined function with the involvement of both the user and the apparatus.

According to the present invention, there is provided a data update system comprising an apparatus that executes a program of performing a predetermined function; and a data supply device connected to the apparatus via a network, that possesses a plurality of expansion data that expands a function of the apparatus and transmits the expansion data to the apparatus; wherein the apparatus includes a data storage unit that stores the program; a receiving unit that receives the expansion data for expanding the function from the data supply device; an update unit that stores the expansion data received by the receiving unit in the data storage unit, thus to add a new program or update the program; a decision unit that decides whether a condition that permits accepting the expansion data is satisfied; a password storage unit that stores a password associated with the plurality of expansion data acquirable under each such condition, to be used when receiving the expansion data from the data supply device; and a password output unit that makes access to the password storage unit and obtains the password for the expansion data corresponding to the decided condition, to output the obtained password to a user; the data supply device includes a table storage unit that stores a table in which the plurality of expansion data and the password are associated; a password acceptance unit that accepts an input of the password by the user; a presentation unit that makes access to the table storage unit, to thereby obtain the plurality of expansion data corresponding to the password accepted by the password acceptance unit and present the expansion data to the user; a selection acceptance unit that accepts the expansion data selected by the user out of the plurality of expansion data presented by the presentation unit; and a transmission unit that reads out the expansion data accepted by the selection acceptance unit from the expansion data storage unit, and transmits the expansion data to the apparatus via the network.

Here, the term of apparatus stands for an apparatus including, for example, a sensor that detects an ambient environment or state, a sensor that detects an approach by the user, and a communication unit that enables a dialogue with the user, and capable of growing, evolving, changing a mode such as emotion or character, and updating a function and a service, and includes a real robot and a virtual robot.

The programs that perform a predetermined function include a program installed in a robot having a means of performing communication with a human, a program installed in an apparatus having a similar user interface, and a program having a means of performing communication with a human, such as a game.

The conditions that activate the update include utilization time of the robot, mode of response or treatment by the user such as whether kindly attended or unkindly treated, and clearance of a game.

The password means a password necessary when obtaining the expansion data from the data supply device, and is associated with the expansion data. Here, the expandable range of the expansion data is limited by the foregoing conditions of the apparatus. Also, the password is associated to the expandable range of the expansion data.

Further, the data supply device means, for example, a Web server connected to the network, which accepts a request of the user and provides information according to the request accepted.

The data update system according to the present invention thus constructed enables determining the type of the expansion data including the program to be incorporated into the apparatus and the timing for the incorporation, with the involvement of both the program incorporated into the apparatus and the user of the apparatus. To be more detailed, the data update system allows determining the type of the expansion data including the program to be incorporated into the apparatus and the timing for the incorporation, with the involvement of both the program incorporated into the apparatus and the user of the apparatus, in the apparatus in which a function is executed based on the data including the program, and capable of modifying the function or adding a function so as to grow, evolve, change the mode such as emotion or character, and to update the function or a service, and when the growth or other changes can be branched into a plurality of options.

In the foregoing data update system, the apparatus may include an issued password storage unit that stores the password output by the password output unit; the transmission unit of the data supply device may transmit the password accepted by the password acceptance unit together with the expansion data; the receiving unit of the apparatus may receive the password from the data supply device together with the expansion data; the update unit of the apparatus may make access to the issued password storage unit, and store the expansion data received by the receiving unit in the data storage unit, when the password received by the receiving unit is stored in the issued password storage unit, thus to add a new program or update the program.

The system thus constructed allows storing the password output by the apparatus as the issued password, and incorporating the expansion data only when the password transmitted with the expansion data accords with the issued password, thereby preventing unauthorized incorporation of the expansion data into apparatus, which results in higher reliability of the system.

The data update system may include a time table storage unit that stores at least one password corresponding to the utilization time of the apparatus, and a timer that measures the utilization time of the apparatus, and the password output unit may make access to the time table storage unit to obtain the at least one password corresponding to the utilization time of the apparatus measured by the timer, and output that password.

Here, the timing to output the password is set at a point after the utilization time stored in the time table storage unit has elapsed.

Such structure allows determining the type of the password and the timing to output the password with the involvement of the program incorporated in the apparatus, according to the utilization time of the apparatus. In other words, the growth of the apparatus based on the elapsed time is not only spontaneously initiated and oriented by the program incorporated in the apparatus, but also can be executed taking into consideration the timing and orientation according to the taste of the user of the apparatus, which provides the user with increased affinity and satisfaction.

In the foregoing data update system, the apparatus may include a state table that contains at least an inner state of the apparatus associated with the password, and a state monitor unit that monitors the inner state of the apparatus, and the password output unit may make access to the state table to obtain the password corresponding to the inner state of the apparatus monitored by the state monitor unit, and output that password.

Here, the inner state means, for example, an emotional value or character simulated by the program installed in the apparatus, or a capacity value of the apparatus available for adding the data.

In the foregoing data update system, the data supply device may include an encryption key calculation unit that calculates an encryption key based on the password accepted by the password acceptance unit, and an encryption unit that reads out and encrypts the expansion data accepted by the selection acceptance unit from the data storage unit with the encryption key calculated by the encryption key calculation unit; the transmission unit of the data supply device may transmit the expansion data encrypted by the encryption unit to the apparatus via the network; the apparatus may include a decryption key calculation unit that calculates a decryption key based on the password stored in the issued password storage unit, and a decryption unit that decrypts the expansion data received by the receiving unit with the decryption key calculated by the decryption key calculation unit; and the update unit of the apparatus may store the expansion data decrypted by the decryption unit in the data storage unit, thus to add a new program or update the program.

Such configuration allows transmitting the data encrypted by the key generated based on the password inaccessible by a third party, between the transmission unit of the data supply device and the receiving unit of the apparatus. This enables preventing incorporation of unauthorized data in the robot, unless the password leaks out to a third party by some means. For example, even when a system operated by a malicious third party exists on the network, such system can be kept from retrieving the data and the password being transmitted and removing the password, and then transmitting the data to the receiving unit in combination with unauthorized data to thereby incorporate the unauthorized data into the robot.

In the foregoing data update system, the apparatus may include an identification unit that identifies a user, a registered member table on which a user authorized to receive a password is registered, and a judgment unit that makes access to the registered member table to judge whether the user identified by the identification unit is included in the registered member table; and the password output unit of the apparatus may output the password when the judgment unit judges that the user is included in the registered member table.

Under such configuration, the user of the apparatus is first identified before outputting the password, and hence the output of the password is limited to only the user authorized in advance. Accordingly, although a guest of the owner or a family member of the owner of the apparatus may have a chance to actually utilize the apparatus, in addition to the owner of the apparatus, the apparatus can be prevented from outputting the password to those persons other than the owner of the apparatus, so as to output the password only to the specific user who is authorized to execute the process of adding the expansion data to the apparatus.

In the foregoing data update system, the apparatus may include a function completion table that contains a parameter indicating completion of utilization of a specific function generated in the apparatus in correlation with the password output when the utilization of the specific function is completed, and a function completion check unit that makes access to the function completion table to monitor the completion of utilization of the specific function generated in the apparatus, and obtains the corresponding password when the completion of utilization is confirmed; and the password output unit of the apparatus may output the password obtained by the function completion check unit.

Here, the functions the completion of utilization of which is monitored inside the apparatus include, for example, a game function played with the user, such that clearance of a predetermined achievement condition of the game is monitored as completion of utilization of the function.

Such configuration allows executing a process of adding new data utilizing an arbitrary occurrence in the apparatus as a trigger.

In the foregoing data update system, the apparatus may include the function completion table for each type of the plurality of functions; and the function completion check unit may monitor the completion of utilization of each of the plurality of functions performed in the apparatus, identify the type of the function the utilization of which is confirmed to have been completed, and make access to the function completion table corresponding to the identified type of the function.

Such configuration allows monitoring the completion of utilization of the function with respect to each type of the plurality of functions of the apparatus, and outputting a different password.

The foregoing data update system may comprise a terminal device connected to the external apparatus via a network, including an acceptance unit that accepts an input of the password or selection of the expansion data and a transmission unit that transmits the input password or the selected expansion data accepted by the acceptance unit to the external apparatus via the network; and the data supply device may include a receiving unit that receives via the network the input password or the selected expansion data transmitted by the terminal device; the password acceptance unit of the data supply device may accept the input of the password received by the receiving unit; and the selection acceptance unit of the data supply device may accept the selection of the expansion data received by the receiving unit.

Here, the terminal device includes, for example, an existing Web browser function, and the data supply device acts as the Web server. The terminal device makes access to the Web server, and the acceptance unit accepts the password input by the user and the selected expansion data through a screen of the Web browser.

Such configuration enables easily making access to the data supply device such as the Web server via the network and transmitting the password input from the terminal device and the selected expansion data to the data supply device, through a popular Web browser.

In the foregoing data update system, the presentation unit of the data supply device may include an instruction unit that instructs a screen display of the plurality of expansion data to the terminal device via the network; and the terminal device may include an instruction acceptance unit that accepts via the network an instruction to display the screen from the instruction unit of the data supply device, and a display unit that displays the screen presenting the plurality of expansion data according to the instruction to display the screen accepted by the instruction acceptance unit.

Here, the terminal device may utilize the Web browser function to display the screen presented by the data supply device via the network.

Such configuration allows utilizing a popular Web browser to make access to the data supply device such as the Web server via the network, and to have the plurality of expansion data presented by the data supply device displayed on the terminal device.

According to the present invention, there is provided a robot apparatus comprising a data storage unit that stores a program of performing a predetermined function; an execution unit that executes the program; a communication unit including at least one of a sound generator and an image display unit; a receiving unit that receives expansion data that expands the function from a data supply device; an update unit that stores the expansion data received by the receiving unit in the data storage unit thus to add a new program or modify the program; a decision unit that decides whether a condition that permits accepting the expansion data is satisfied; a password storage unit that stores a password associated with the plurality of expansion data acquirable under each such condition, to be used when receiving the expansion data from the data supply device; and a password acquisition unit that makes access to the password storage unit and obtains the password for the expansion data corresponding to the decided condition; wherein the password obtained by the password acquisition unit is output to a user via the communication unit.

According to the present invention, there is provided a data supply device comprising a connector for connection via a network to an apparatus that executes a program of performing a predetermined function; an expansion data storage unit that stores a plurality of expansion data that expands a function of the apparatus; a table storage unit that stores a table on which the plurality of expansion data and the password are associated with each other; a password acceptance unit that accepts an input of the password by a user; a presentation unit that makes access to the table storage unit to obtain the plurality of expansion data corresponding to the password accepted by the password acceptance unit, and presents the expansion data to the user; a selection acceptance unit that accepts the expansion data selected by the user out of the plurality of expansion data presented by the presentation unit; and a transmission unit that reads out the expansion data accepted by the selection acceptance unit from the expansion data storage unit, and transmits the expansion data to the apparatus via the network.

According to the present invention, there is provided a data update method of controlling a data structure of an apparatus by transmitting, via a network, expansion data from a data supply device including an expansion data storage unit that stores a plurality of expansion data, to the apparatus including a data storage unit that stores a program that performs a predetermined function and an execution unit that executes the program, comprising deciding, in the apparatus including a password storage unit that stores a password, associated with the plurality of expansion data acquirable under each condition that permits accepting the expansion data and to be used when receiving the expansion data from the data supply device, whether the condition is satisfied; making access to the password storage unit and obtaining the password for the expansion data corresponding to the decided condition; and outputting to a user the password obtained at the step of obtaining the password; accepting, in the data supply device including a table storage unit that stores a table on which the plurality of expansion data and the password are associated with each other, an input of the password by the user; making access to the table storage unit and obtaining the plurality of expansion data corresponding to the password accepted by the password acceptance unit; presenting the plurality of expansion data to the user; accepting the expansion data selected by the user out of the presented plurality of expansion data; and reading out the accepted expansion data from the expansion data storage unit, and transmitting the expansion data to the apparatus via the network; receiving, in the apparatus, the expansion data that expands the function from the data supply device; and storing the received expansion data in the data storage unit, thus adding a new program or updating the program.

According to the present invention, there is provided a robot system comprising a robot apparatus that executes a program of performing a predetermined function; and a data supply device connected to the robot apparatus via a network, that possesses a plurality of expansion data that expands a function of the robot apparatus and transmits the expansion data to the robot apparatus; wherein the robot apparatus includes a data storage unit that stores a program of performing a predetermined function; an execution unit that executes the program; a communication unit including at least one of a sound generator and an image display unit; a receiving unit that receives expansion data that expands the function from a data supply device; an update unit that stores the expansion data received by the receiving unit in the data storage unit thus to add a new program or update the program; a decision unit that decides whether a condition that permits accepting the expansion data is satisfied; a password storage unit that stores a password associated with the plurality of expansion data acquirable under each such condition, to be used when receiving the expansion data from the data supply device; a password acquisition unit that makes access to the password storage unit and obtains the password for the expansion data corresponding to the decided condition; and a password output unit that outputs the password obtained by the password acquisition unit to the user via the communication unit; and the data supply device includes a table storage unit that stores a table on which the plurality of expansion data and the password are associated with each other; a password acceptance unit that accepts an input of the password by a user; a presentation unit that makes access to the table storage unit to obtain the plurality of expansion data corresponding to the password accepted by the password acceptance unit, and presents the expansion data to the user; a selection acceptance unit that accepts the expansion data selected by the user out of the plurality of expansion data presented by the presentation unit; and a transmission unit that reads out the expansion data accepted by the selection acceptance unit from the expansion data storage unit, and transmits the expansion data to the robot apparatus via the network.

The robot system thus constructed allows not only spontaneously initiating and orienting the growth of the robot based on the program incorporated in the robot, but also executing the growth taking into consideration the timing and orientation according to the taste of the user of the robot, thereby providing the user with increased affinity and satisfaction.

According to the present invention, there is provided a data update program for updating data of an apparatus by transmitting, via a network, expansion data from a data supply device possessing a plurality of expansion data that expands a function of the apparatus, to the apparatus including a data storage unit that stores a program that performs a predetermined function and an execution unit that executes the program, the data update program including: a program that allows the apparatus including a password storage unit that stores a password, associated with the plurality of expansion data acquirable under each condition that permits accepting the expansion data and to be used when receiving the expansion data from the data supply device, to execute steps of: deciding whether the condition is satisfied; making access to the password storage unit to obtain the password for the expansion data corresponding to the decided condition; and outputting to a user the password obtained in the obtaining step, a program that allows the data supply device including a table storage unit that stores a table on which the plurality of expansion data and the password are associated, to execute steps of: accepting an input of the password by the user; making access to the table storage unit to obtain the plurality of expansion data corresponding to the password accepted in the accepting step; presenting the plurality of expansion data to the user; accepting the expansion data selected by the user out of the presented plurality of expansion data; and reading out the accepted expansion data from the expansion data storage unit, to transmit the expansion data to the apparatus via the network, and a program that allows the apparatus to execute steps of: receiving the expansion data that expands the function from the data supply device; and storing the received expansion data in the data storage unit, thus to add a new program or update the program.

It is to be noted that any optional combination of the foregoing constituents, as well as any conversion of the expressions of the present invention among a method, apparatus, system, recording medium and computer program are effectively included in the scope of the present invention.

The present invention provides a data update system that allows expanding data for performing a predetermined function, with the involvement of both the user and the apparatus.

The present invention is applicable to a use of a program incorporated in a robot that performs communication with a human. The present invention is also applicable to a use of a program incorporated in a general apparatus having an interface with the human.

BRIEF DESCRIPTION OF THE DRAWINGS

The foregoing and other objects, features and advantages will become more apparent through the following description on exemplar embodiments and the accompanying drawings specified here below.

FIG. 5 is a table showing an example of a data arrangement in a state table in the table storage unit of the robot sub system in the robot system shown in FIG. 1;

FIG. 6 shows an example of a password table in the table storage unit of the robot sub system in the robot system shown in FIG. 1;

BEST MODE FOR CARRYING OUR THE INVENTION

Figure 1:
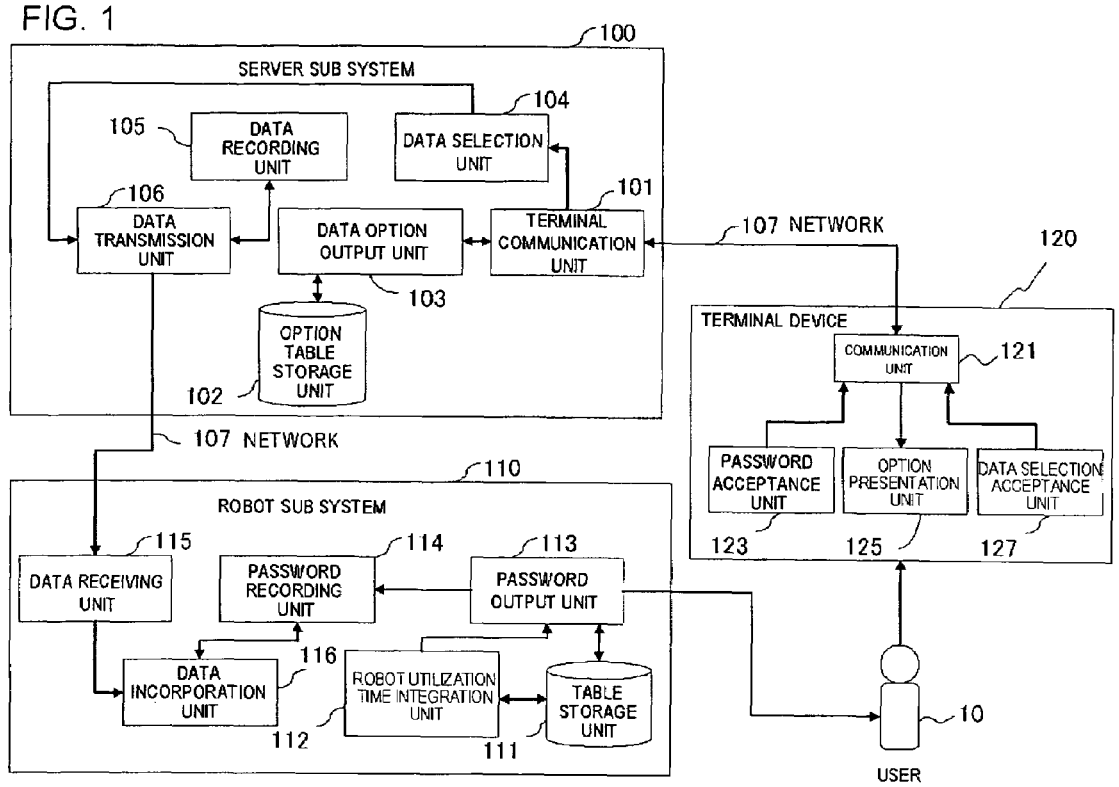
FIG. 1 is a schematic block diagram showing a configuration of an embodiment of a robot system according to the present invention.

Hereunder, embodiments of the present invention will be described referring to the drawings. In all the drawings, same constituents are given identical numerals, and the description thereof will not be repeated.

First Embodiment

FIG. 1 is a schematic block diagram showing a configuration of a first embodiment of a robot system according to the present invention. The robot system according to this embodiment includes a robot sub system 110 that operates a robot (not shown in FIG. 1), a terminal device 120 connected to the robot sub system 110 via a network 107, and a server sub system 100 connected to the terminal device 120 via the network 107.

Here, the term of robot stands for an apparatus including a sensor that detects an ambient environment or state (a temperature sensor, humidity sensor, atmospheric pressure sensor, wind direction sensor, wind speed sensor, light sensor, vibration sensor, sound sensor, infrared sensor and so on), an image recognition or sound recognition unit for identifying a user 10, a sensor that detects an approach by the user 10 (a switch, touch sensor), and a communication unit that enables a dialogue with the user 10 (conversation, gesture and the like), and capable of growing, evolving, changing a mode such as emotion or character, updating a function and providing a service, according to the state and the condition. The updating of a function and the provision of a service may be executed by downloading and incorporating program data from the server sub system 100 into the robot sub system 110, and executing the program data. In this embodiment, the robot may be either of a so-called real robot or virtual robot. Specific structure of the robot will be subsequently described.

The network 107 is for example the Internet, which allows connection among apparatuses via cable or wireless communication. Although the server sub system 100 and the robot sub system 110, as well as the server sub system 100 and the terminal device 120 are connected via the same network 107 in FIG. 1, a different network may be utilized without limitation to such configuration.

The server sub system 100 is for example a Web server, and provides information according to a request from the terminal device 120. In this embodiment, the server sub system 100 accepts a password from the terminal device 120, and transmits a data identifier of a plurality of program data corresponding to the accepted password as an option to the terminal device 120. The terminal device 120 presents the option received from the server sub system 100 to the user 10, accepts the data identifier selected by the user 10 out of the option, and transmits to the server sub system 100. The server sub system 100 transmits the program data corresponding to the received data identifier to the robot sub system 110, to thereby expand the function of the robot.

Here, the password is a word that the user 10 inputs via the terminal device 120 when making access to the server sub system 100, in order to download the program data for expanding a function of the robot or providing a service from the server sub system 100 to the robot sub system 110. In this embodiment, the password is a word such as "blue sky" or "dark night", which is unrelated to the data to be downloaded. Accordingly, the user 10 does not know yet what kind of expansion of a function or a service is available, at the time of obtaining the password.

Also, in the server sub system 100, the password is associated with at least one of the data identifiers corresponding to the program data as described later, and the at least one data identifier is presented to the user 10 as the option via the terminal device 120, when the password input by the user 10 is accepted. Thus, the user 10 is permitted to select the data from the option.

The robot sub system 110 is included in the robot, and receives the program data for expanding the function of the robot and the data for providing the service from the server sub system 100, and incorporates into the robot. Also, in this embodiment, the robot sub system 110 presents the password to the user 10 according to utilization history or state of the robot. Further details will follow later.

The terminal device 120 is, for example, a personal computer containing a client software such as the Web browser for making access to the server sub system 100 such as the Web server on the network 107. The user of the robot can make access to the server sub system 100 via the network 107 utilizing the Web browser. In this embodiment, the terminal device 120 accepts the password input by the user 10 and transmits to the server sub system 100, as well as presents as the option the data identifier of the plurality of program data received from the server sub system 100, and transmits the data identifier selected by the user 10 from the option to the server sub system 100. Hereinafter, the program data will be simply referred to as "data".

Here, in all the drawings, configuration of portions unrelated to the essence of the present invention is not shown such that, for example, a situation detection unit, situation decision unit, image recognition unit, sound recognition unit, sound output unit, movement operation unit and so on are not shown, though they are also components of the robot.

Also, the components of the robot system are constituted of a optional combination of hardware and software mainly including a CPU and a memory of any computer, a program loaded in the memory for operation of the constituents shown in FIG. 1, a storage unit such as a hard disk that stores therein the program, and an interface for connection to the network. And it is apparent to those skilled in the art that various modifications may be made in the operation method and the apparatus. The drawings referred to here below represent blocks defined by functions, not by hardware.

Hereunder, the server sub system 100, the robot sub system 110, and the terminal device 120 will be described in turn.

The server sub system 100 includes a terminal communication unit 101, an option table storage unit 102, a data option output unit 103, a data selection unit 104, a data recording unit 105, and a data transmission unit 106.

The terminal communication unit 101 makes communication with the terminal device 120 via the network 107. To be more detailed, the terminal communication unit 101 receives the password and the data identifier from the terminal device 120 via the network 107, and transmits an option including at least one data identifier to the terminal device 120, via the network 107.

Figure 2:
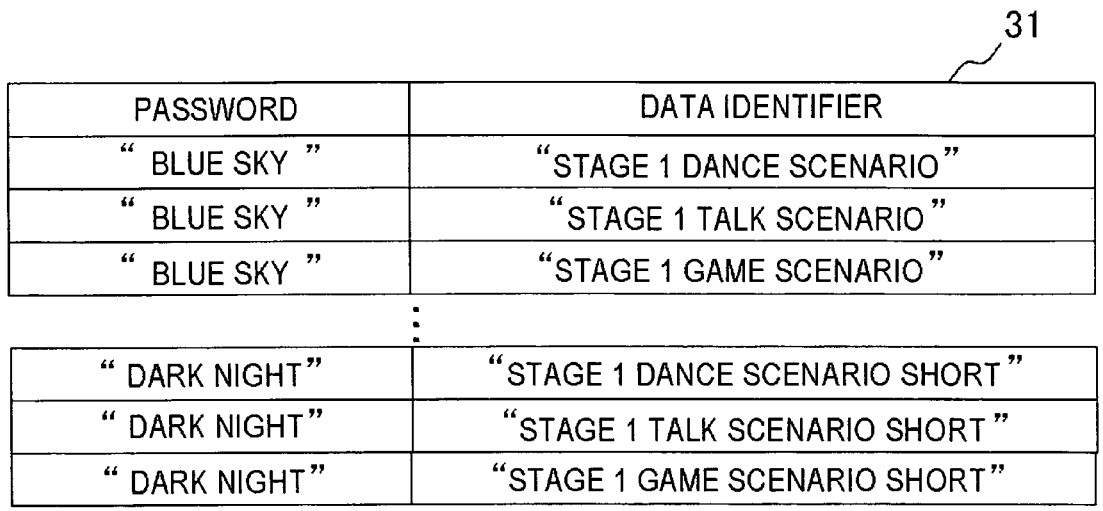
FIG. 2 is a table showing an example of a data arrangement in an option table in the option table storage unit of the server sub system in the robot system shown in FIG. 1.

The option table storage unit 102 stores an option table showing a correlation between at least one password and at least one data identifier corresponding thereto. FIG. 2 shows an example of the option table 31. As shown in FIG. 2, a plurality of data identifiers is associated with one password, for example "blue sky".

Back to FIG. 1, the data option output unit 103 receives the input of the password received by the terminal communication unit 101 via the network 107, makes access to the option table 31 in the option table storage unit 102, obtains at least one data identifier corresponding to the input password, and outputs to the terminal communication unit 101 as a data option.

For example, when the password of "dark night" is input from the terminal communication unit 101, the data option output unit 103 makes access to the option table 31 in the option table storage unit 102, obtains three data identifiers corresponding to the password of "dark night", namely "stage 1 dance scenario short", "stage 1 talk scenario short", and "stage 1 game scenario short" as shown in FIG. 2, and outputs the three data identifiers to the terminal communication unit 101, as data option.

The data selection unit 104 receives the input of the password and the data identifiers received by the terminal communication unit 101 via the network 107, and outputs those to the data transmission unit 106, thereby instructing to transmit the data to the robot sub system 110.

The data option output unit 103 and the data selection unit 104 may be constituted of an existing Web server and Web browser, as an example. In this example, it is assumed that the Web browser is operable by the user 10 of the robot in the terminal device 120 connected to the Web server via the network 107, and that the Web server is operable in the server sub system 100.

The user 10, who has acquired the password from the robot sub system 110, operates the Web browser through the terminal device 120 to input the password, at a timing determined by the user 10's own will. Based on the password received via the terminal communication unit 101, the data option output unit 103 narrows down the types of data that can be added to the robot, i.e. the data identifiers according to the input password, thus to obtain a list. The user 10 looks over the list in the Web browser of the terminal device 120, to select the type of the data to be added and input. The type of the data that has been input is accepted by the data selection unit 104 via the terminal communication unit 101.

Figure 3:
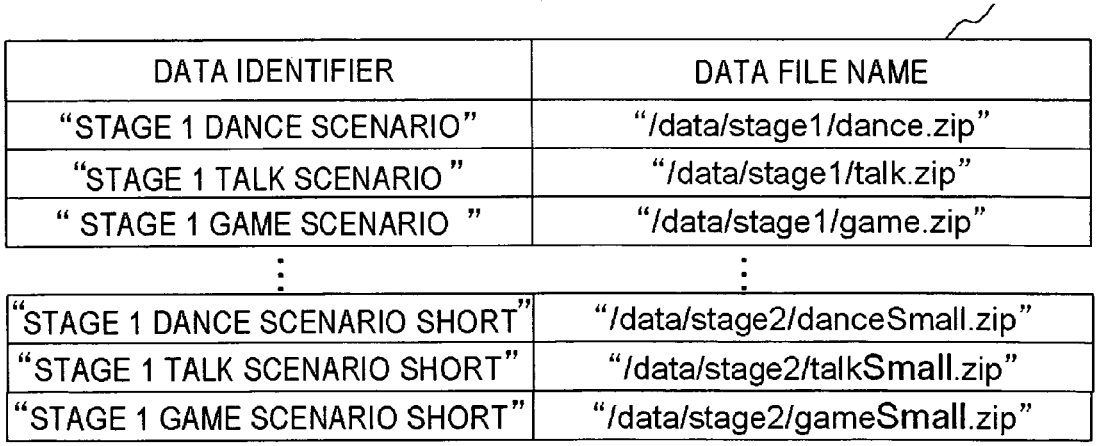
FIG. 3 is a table showing an example of a data arrangement in a file table in the data recording unit of the server sub system in the robot system shown in FIG. 1.

The data recording unit 105 records at least one datum for performing a predetermined function associated with the data identifier. The recorded datum has to be identifiable by the data identifier. FIG. 3 shows an example of a file table 33 in which the data identifier is stored in association with the data file name. The data recording unit 105 includes the data and the file table 33.

Back to FIG. 1, the data transmission unit 106 receives the input of the password and the data identifier from the data selection unit 104, and makes access to the file table 33 in the data recording unit 105, to obtain the data file name corresponding to the data identifier. The data transmission unit 106 reads out the data of the data file name from the data recording unit 105, and transmits the password and the data to the robot sub system 110 via the network 107.

Figure 4:
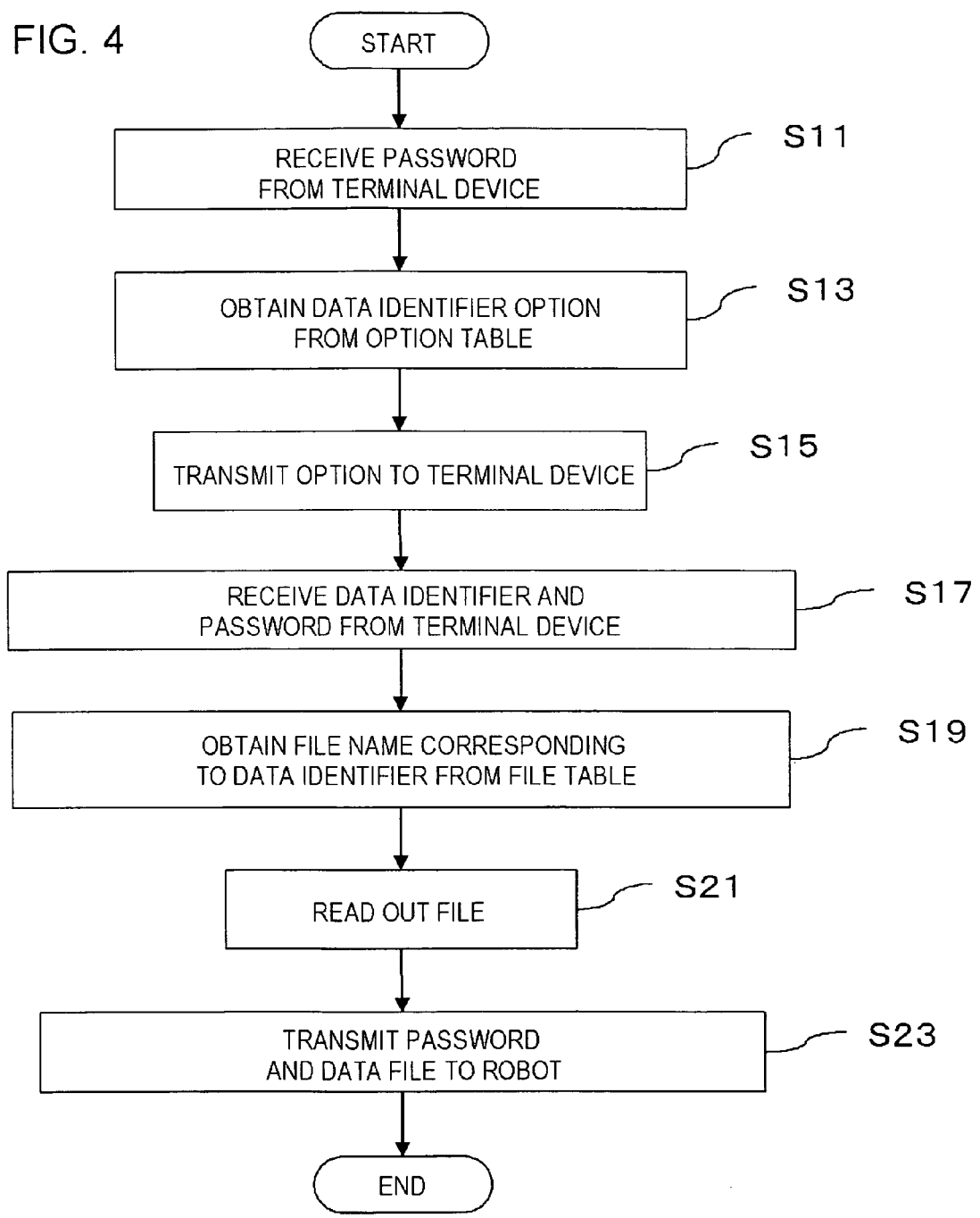
FIG. 4 is a flowchart showing an example of an operation of the server sub system in the robot system shown in FIG. 1.

An operation of the server sub system 100 thus configured will be described hereunder. FIG. 4 is a flowchart showing an example of an operation of the server sub system 100 according to this embodiment.

Here, the flowchart shows the process in which the user 10 inputs, after the robot sub system 110 has output the password to the user 10, that password through the terminal device 120 at a timing determined by the user 10.

Firstly, the terminal communication unit 101 receives the password from the terminal device 120 via the network 107 (step S11). It is assumed here that the password of "blue sky" has been input. Then the data option output unit 103 makes access to the option table 31 in the option table storage unit 102, and obtains at least one data identifier corresponding to the password received at the step S11 (S13). Specifically, the three data identifiers corresponding to the password of "blue sky" is obtained. After that, the terminal communication unit 101 transmits the at least one data identifier obtained by the data option output unit 103 at the step S13 to the terminal device 120 via the network 107 (S15). At this stage, the terminal device 120 receives the at least one data identifier and presents the data identifier to the user 10, urging the selection.

Thereafter, the server sub system 100 is on standby for the arrival of the data identifier from the terminal device 120. Now, the user 10 determines a data identifier out of the at least one data identifier, and inputs the data identifier through the terminal device 120. When the terminal communication unit 101 receives the data identifier and the password from the terminal device 120 (step S17), the data selection unit 104 makes access to the file table 33 in the data recording unit 105, and obtains a data file name corresponding to the data identifier received from the file table 33 (step S19). Assuming here that the data identifier of "stage 1 talk scenario" has been received from the terminal device 120, the data file name of "/data/stage1/talk.zip/" is then obtained.

Then the data transmission unit 106 reads out a corresponding data file from the data recording unit 105 (step S21). The data file read out and the password are transmitted to the robot sub system 110 via the network 107 (step S23).

Thus, the server sub system 100 can accept the password at a timing determined by the user 10, and transmit the expansion data selected by the will of the user 10 to the robot sub system 110, at a timing determined by the user 10.

The robot sub system 110 will now be described. Back to FIG. 1, the robot sub system 110 includes a table storage unit 111, a robot utilization time integration unit 112, a password output unit 113, a password recording unit 114, a data receiving unit 115, and a data incorporation unit 116.

The table storage unit 111 stores therein a state table 41 and a password table 43, shown in FIGS. 5 and 6, respectively. The state table 41 stores at least one correlation between the utilization time of the robot and a password identifier to be output when the utilization time is reached. The password table 43 stores a correlation between the password identifier and at least one password.

Referring again to FIG. 1, the robot utilization time integration unit 112 measures the utilization time of the robot since the user 10 purchased the robot up to the current time, and makes access to the state table 41 of the table storage unit 111 to output, if the password identifier corresponding to the current utilization time of the robot is available, the password identifier to the password output unit 113.

The password output unit 113 makes access to the password table 43 in the table storage unit 111, obtains the password corresponding to the password identifier input, outputs and transmits the obtained password to the user 10 of the robot, and outputs the obtained password to the password recording unit 114 for recording. The timing that the password output unit 113 outputs the password, and selection of the password to be output are determined by a decision unit such as the robot utilization time integration unit 112, which decides whether a condition that permits the robot to accept the expansion data. In this embodiment, the timing that the password output unit 113 outputs the password includes, in addition to the time when the password identifier is input, the time when the user 10 of the robot requests the password after the password identifier is input.

Here, the password may be audibly output through a speaker or the like. Alternatively, the password may be output by a printer that provides a printout of the password, or through communication by the robot in sign language or gesture, or may be written by the robot on a paper with a writing material. Otherwise, the password may be transmitted by mail from the robot to a preregistered mail address.

The password recording unit 114 receives the input of the password output by the password output unit 113, and records the password as an issued password. The issued password recorded in the recording unit 114 is used for deciding, upon receipt of the password and the data from the server sub system 100, whether the received password and the issued password recorded in the password recording unit 114 are matched with each other.

The data receiving unit 115 receives the password and the data from the server sub system 100 via the network 107, and outputs those to the data incorporation unit 116.

The data incorporation unit 116 receives the input of the password and the data from the data receiving unit 115, and makes access to the password recording unit 114, to confirm whether the input password is matched with the issued password recorded in the password recording unit 114. In the affirmative case, the data incorporation unit 116 deletes the issued password from the password recording unit 114, and executes the process of incorporating the input data into the robot. When the input password is not matched with the issued password recorded in the password recording unit 114, the incorporation of the input data is not executed. Here, the incorporation of the data is to be construed as storing for example the expansion data that expands the function of the robot in a memory unit (not shown in FIG. 1), thus to add a new program or update the program stored in the memory unit.

Also, the deletion of the issued password from the password recording unit 114 may be executed when different data associated to the same password is incorporated over a predetermined number of times. Adopting such procedure enables incorporating the data into the robot over the predetermined number of times, in correspondence to one password output by the password output unit 113.

Figure 7:
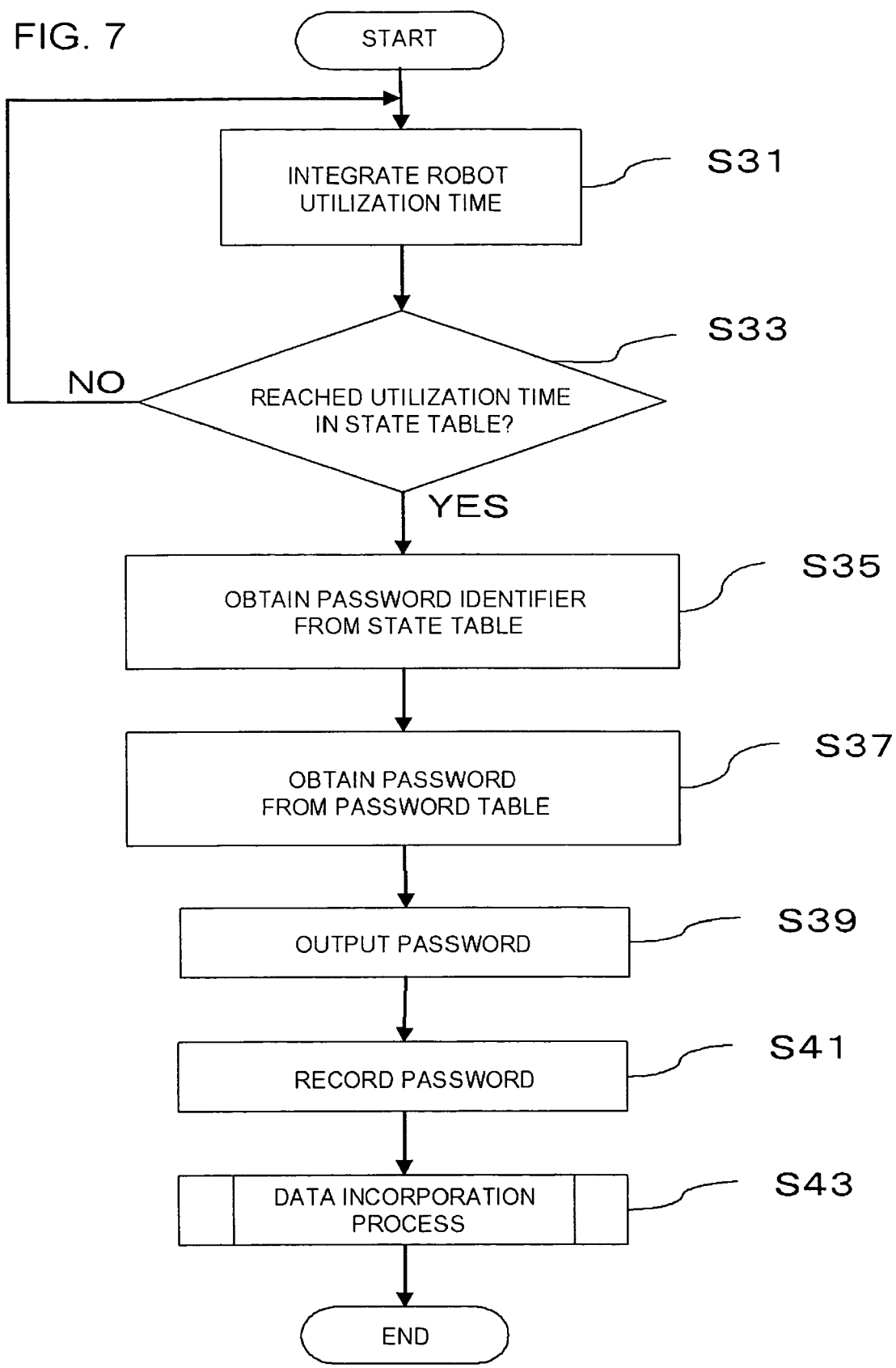
FIG. 7 is a flowchart showing an example of an operation of the robot sub system in the robot system shown in FIG. 1.
Figure 8:
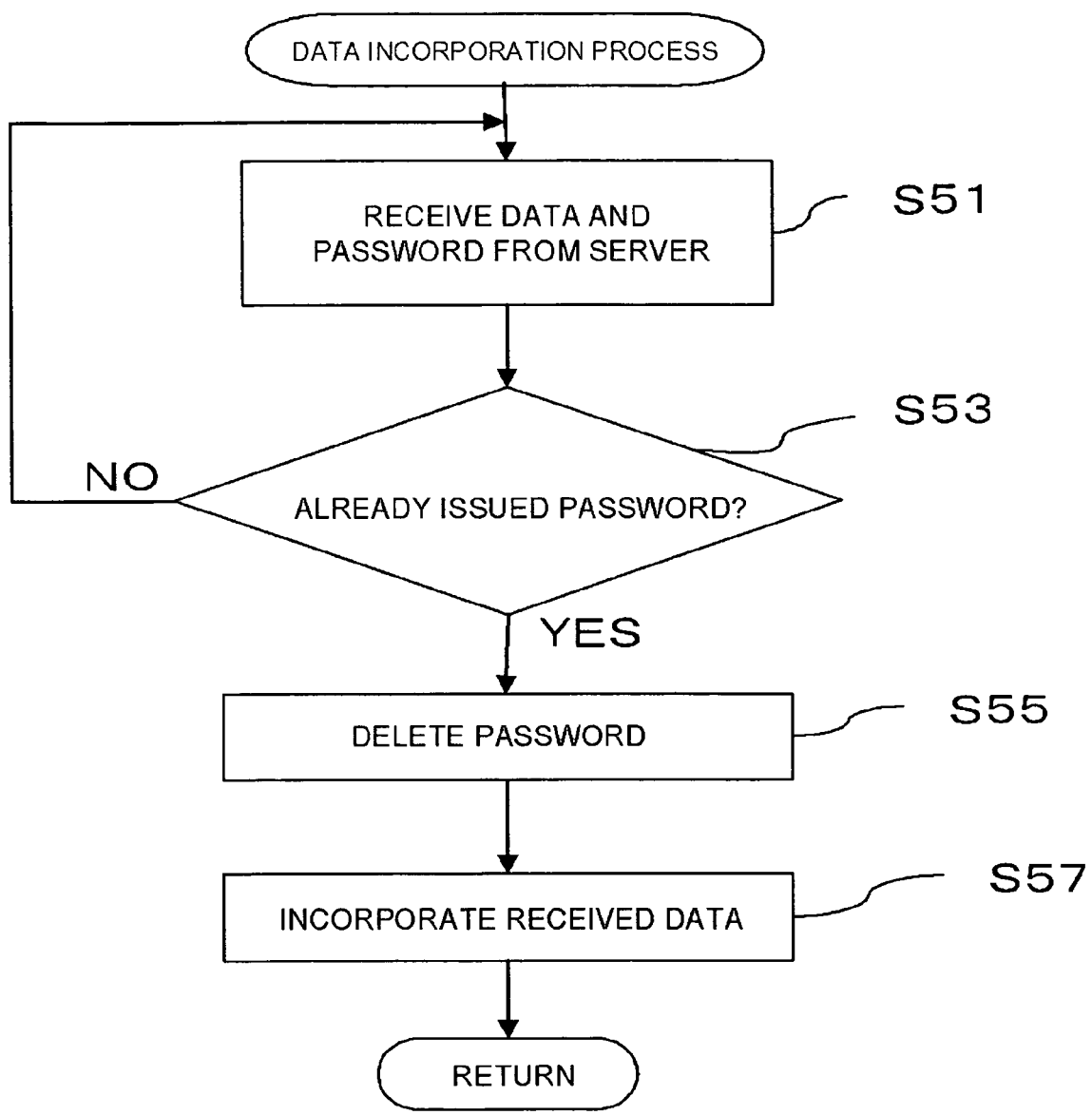
FIG. 8 is a flowchart showing an example of the data incorporation process shown in FIG. 7.

An operation of the robot sub system 110 thus configured will be described hereunder. FIGS. 7 and 8 are flowcharts showing an example of the operation of the robot sub system 110 according to this embodiment.

Referring to FIG. 7, firstly the robot utilization time integration unit 112 measures and integrates the time during which the robot is utilized, since the user 10 purchased the robot up to the current time (step S31). The robot utilization time integration unit 112 makes access to the state table 41 of the table storage unit 111, to decide whether the current utilization time of the robot has reached the utilization time designated by the password identifier (step S33). If it is decided that the utilization time in the state table 41 has been reached (YES at S33), the robot utilization time integration unit 112 obtains the corresponding password identifier in the state table 41 of the table storage unit 111 (step S35). On the other hand, if it is decided that the utilization time in the state table 41 has not been reached (NO at S33), the operation returns to the step S31. It is assumed here that the utilization time "2" has been reached, and the password identifier "stage 1" has been obtained.

The password output unit 113 makes access to the password table 43 in the table storage unit 111, and obtains the password corresponding to the password identifier obtained from the robot utilization time integration unit 112 at the step S35 (step S37). The password output unit 113 then outputs the obtained password (step S39), and records the output password in the password recording unit 114 as an issued password (step S41). Here, the password output unit 113 outputs the password "blue sky" corresponding to the password identifier "stage 1", and records the password "blue sky" in the password recording unit 114 as the issued password.

Thus, the robot sub system 110 can decide the timing to output the password based on the utilization time measured by the robot utilization time integration unit 112. Then the robot sub system 110 enters a standby state for receiving the expansion data from the server sub system 100, and the data incorporation unit 116 executes the data incorporation process shown in FIG. 8 (step S43). FIG. 8 is a flowchart showing the data incorporation process by the robot sub system 110.

Firstly, the data receiving unit 115 is on standby for the receipt of the password and the data from the server sub system 100 via the network 107. When the data receiving unit 115 receives the password and the data from the server sub system 100 via the network 107 (step S51) the data receiving unit 115 outputs the password and the data to the data incorporation unit 116. Then, the data incorporation unit 116 makes access to the password recording unit 114, to decide whether the input password is matched with the issued password (step S53). In the affirmative case (YES at S53), the data incorporation unit 116 deletes the issued password in the password recording unit 114 (step S55). Then the data incorporation unit 116 incorporates the received data (step S57).

It is assumed here that the password "blue sky" and the data "talk.zip" have been received from the server sub system 100. Accordingly, since the password is matched with the issued password in the password recording unit 114, the password is deleted from the password recording unit 114, and incorporates the data. In this way, the "stage 1 talk scenario" is newly incorporated into the robot.

Hereunder, the terminal device 120 will be described. Referring again to FIG. 1, the terminal device 120 includes a communication unit 121, a password acceptance unit 123, an option presentation unit 125, and a data selection acceptance unit 127.

The communication unit 121 makes communication with the server sub system 100 via the network 107. The communication unit 121 transmits the password and the data identifier to the server sub system 100, and receives an option including at least one data identifier, from the server sub system 100.

Figure 9:
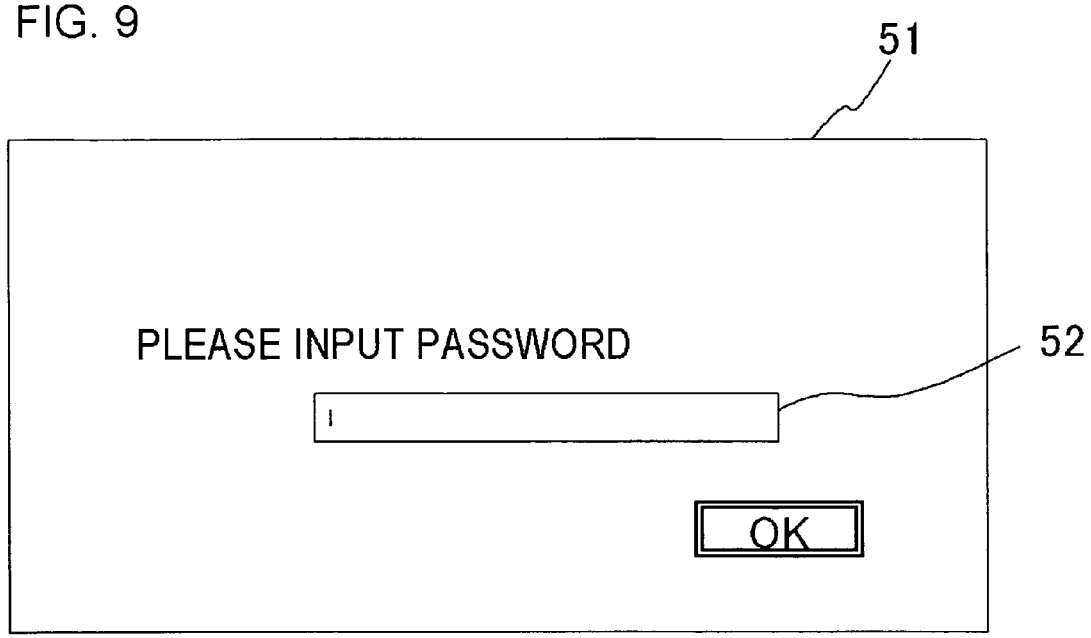
FIG. 9 shows an example of a password input screen of the terminal device of the robot system shown in FIG. 1.

The password acceptance unit 123 accepts the password that the user 10 input to the terminal device 120, after recognizing the password output from the robot sub system 110. The accepted password is output to the communication unit 121. The password acceptance unit 123 includes, for example, operational input unit such as an operation button, a switch, a lever, a keyboard, a tablet, or a touch panel, a sound collecting microphone, and a sound recognition unit. FIG. 9 shows an example of an input screen for accepting the password by the password acceptance unit 123. The password input screen 51 includes a password input column 52, and the password acceptance unit 123 accepts the password input into the password input column 52.

Back to FIG. 1, the option presentation unit 125 presents to the user 10 the option including at least one data identifier transmitted from the server sub system 100. The option presentation unit 125 includes, for example, a display unit such as a lamp, an LED, a CRT monitor, or an LCD display, a sound output unit such as a speaker, and a printer unit.

The data selection acceptance unit 127 accepts the data identifier selected by the user 10 out of the option presented by the option presentation unit 125. The accepted data identifier is output to the communication unit 121 together with the password accepted by the password acceptance unit 123. The data selection acceptance unit 127 may be similarly configured to the password acceptance unit 123.

Figure 10:
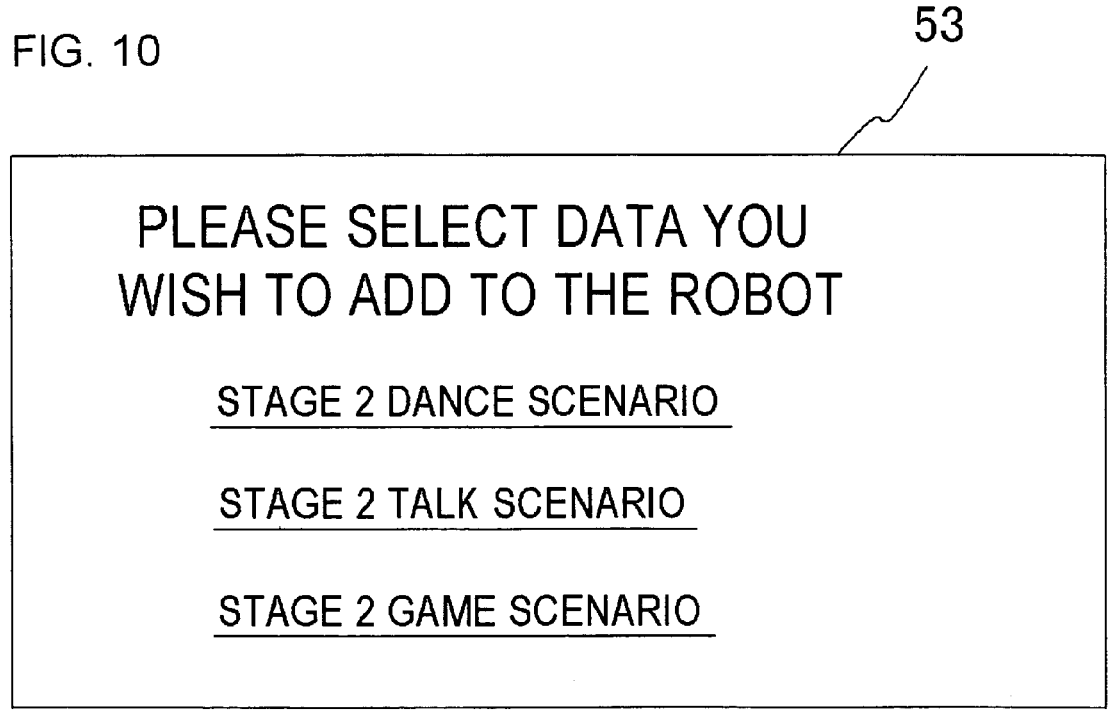
FIG. 10 shows an example of a data selection screen of the terminal device of the robot system shown in FIG. 1.

FIG. 10 shows an example of a data selection screen 53. The option presentation unit 125 presents at least one data identifier through the data selection screen 53. The user 10 can select the data identifier for example by a mouse click on one of a plurality of data identifiers presented on the data selection screen 53, and the selected data identifier is accepted by the data selection acceptance unit 127.

Figure 11:
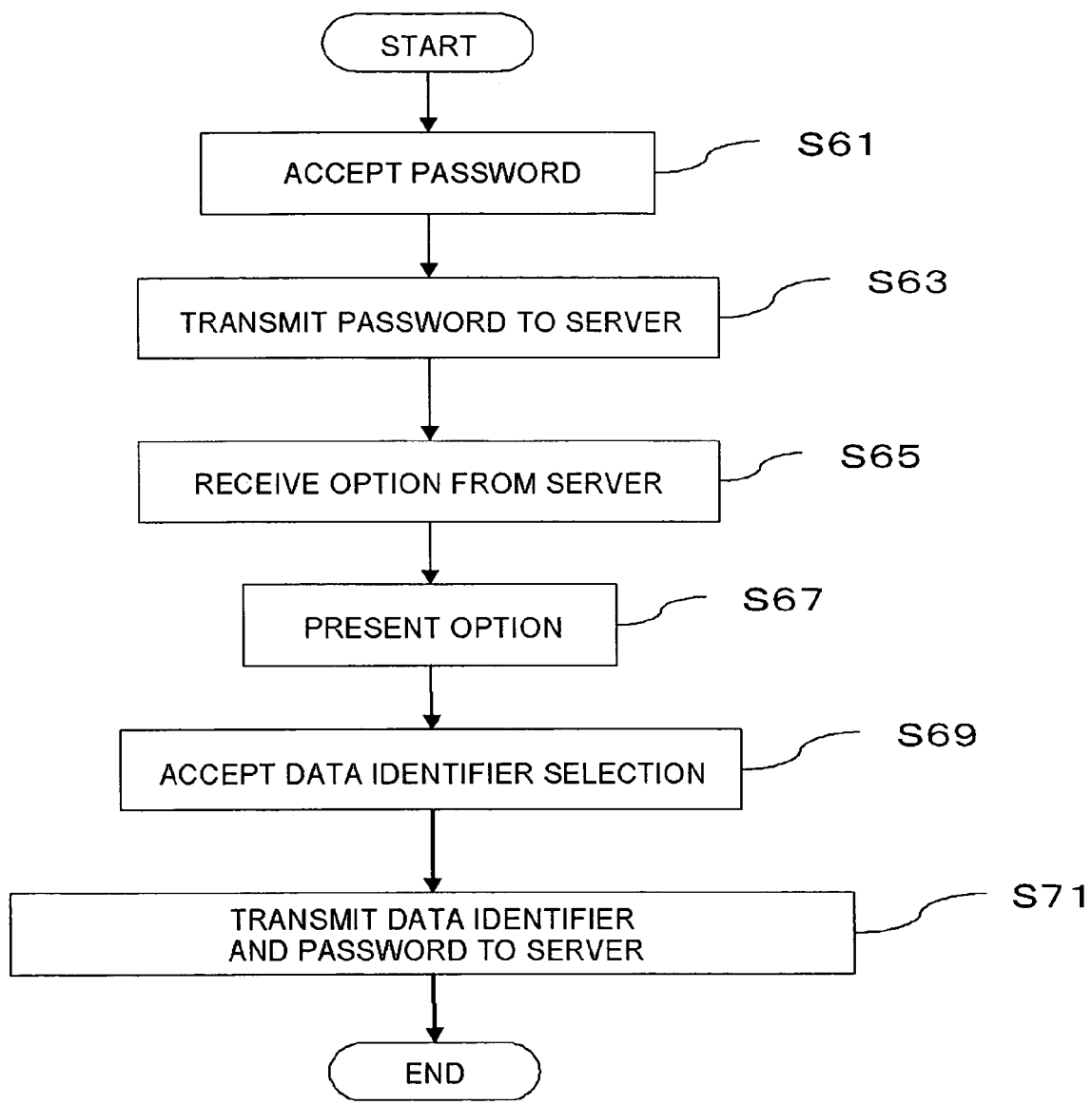
FIG. 11 is a flowchart showing an example of an operation of the terminal device in the robot system shown in FIG. 1.

An operation of the terminal device 120 thus configured according to this embodiment will be described hereunder. FIG. 11 is a flowchart showing an example of an operation of the terminal device 120 according to this embodiment.

Firstly, the user 10 inputs the password into the password input screen 51 shown in FIG. 9 at a timing determined by the user 10's own will, and the password acceptance unit 123 accepts the input password (step S61). In this embodiment, the password of "blue sky" is accepted.

Then the communication unit 121 transmits the accepted password to the server sub system 100 via the network 107 (step S63). After that, the terminal device 120 enters a standby state for the response from the server sub system 100.

Then the option including at least one data identifier is received from the server sub system 100 via the network 107 (step S65). In this embodiment, the option including three data identifiers is received. The option presentation unit 125 then displays the received option on the data selection screen 53 shown in FIG. 10, for presentation to the user 10 (step S67). The user 10 selects the data identifier by his/her own will out of the presented option, and inputs the selected data identifier in the terminal device 120 at the timing determined by his/her own will.

Thereafter, the data selection acceptance unit 127 accepts the data identifier selected by the user 10 on the data selection screen 53 shown in FIG. 10 (step S69). The communication unit 121 transmits the accepted data identifier to the server sub system 100 via the network 107 (step S71). Here, it is assumed that the user 10 has selected the "stage 1 talk scenario".

Figure 12:
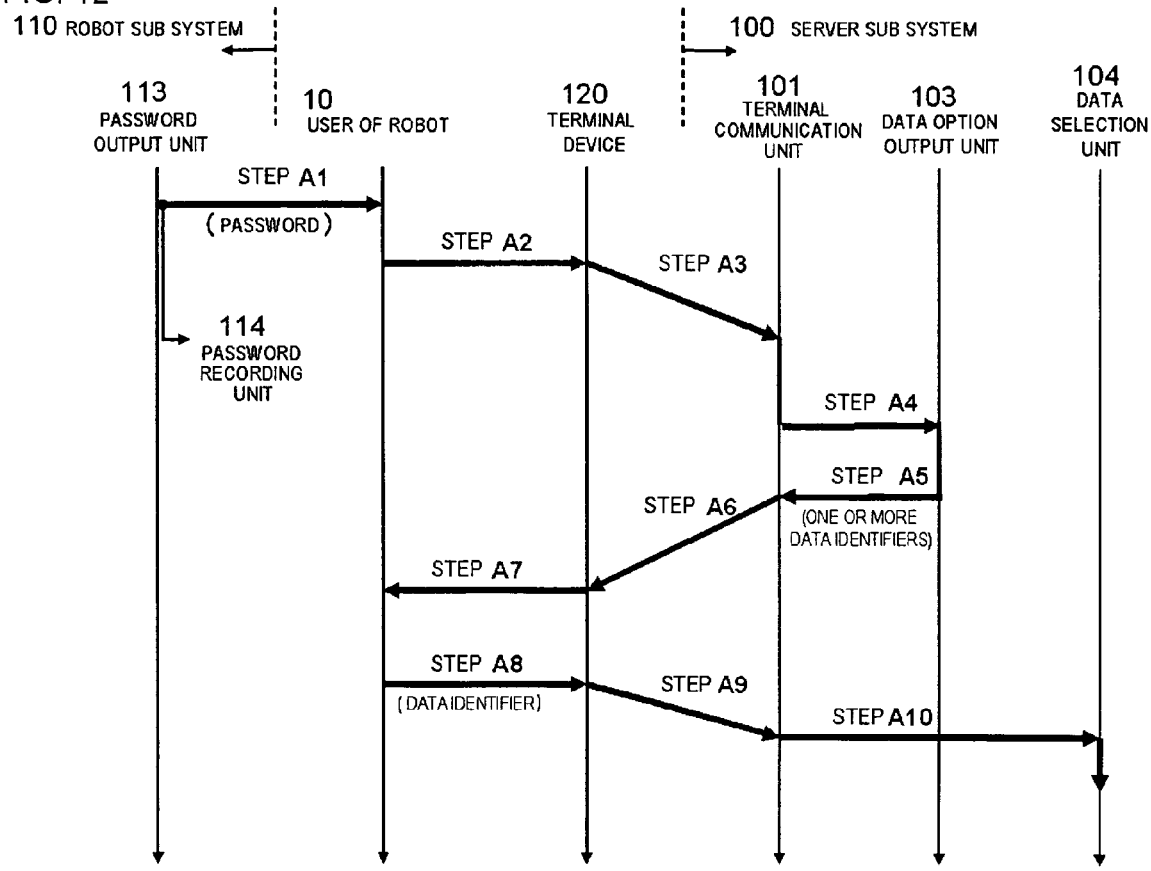
FIG. 12 is a time chart showing the operation of the robot system shown in FIG. 1.
Figure 13:
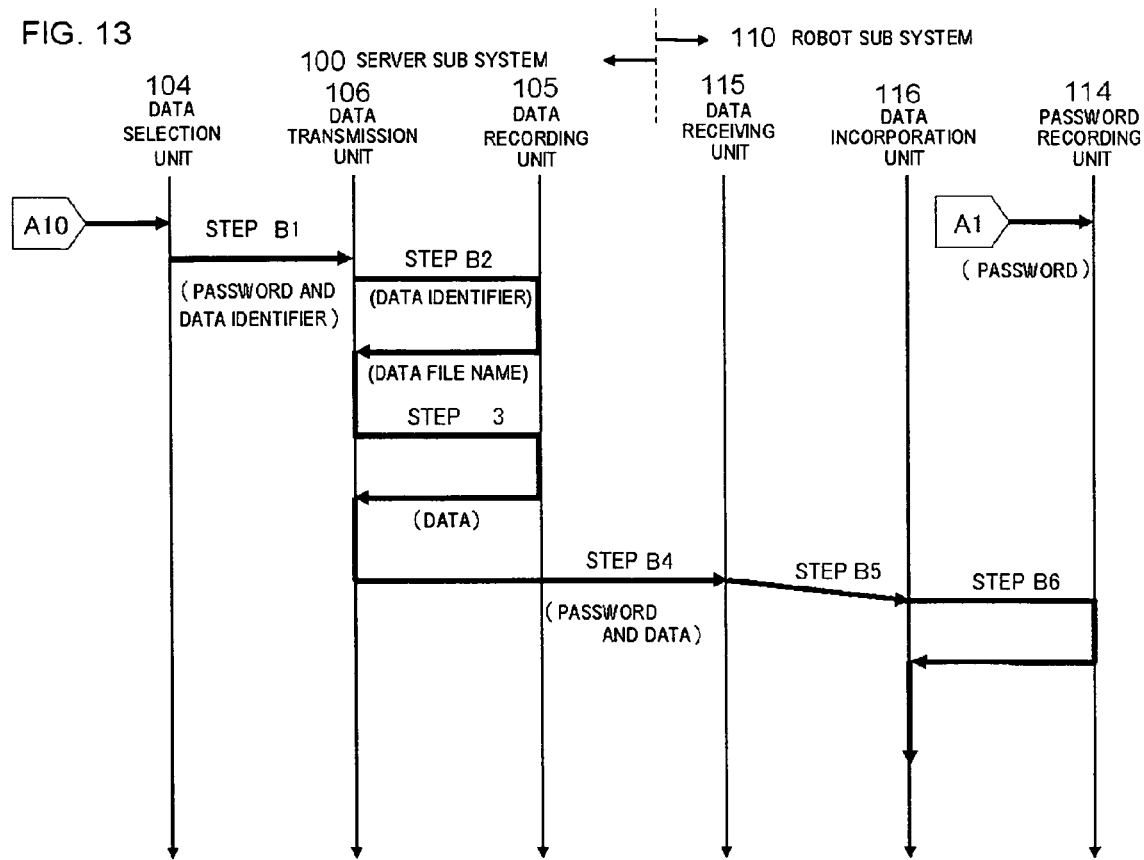
FIG. 13 is a time chart showing the operation of the robot system shown in FIG. 1, subsequent to FIG. 12.

An operation of the robot system thus constructed according to this embodiment will be described hereunder. FIGS. 12 and 13 are time charts showing the operation of the robot system according to this embodiment.

Referring to FIG. 12, firstly in the robot sub system 110, the password output unit 113 outputs the password and notifies to the user 10 of the robot (step A1). Here, the password output by the password output unit 113 is simultaneously recorded in the password recording unit 114. The user 10 of the robot inputs the password through the terminal device 120 at a desired time subsequent to the step A1 (step A2) The input password is accepted by the password acceptance unit 123 of the terminal device 120, and transmitted by the communication unit 121, from the terminal device 120 to the server sub system 100 via the network 107 (step A3).

Then in the server sub system 100, the terminal communication unit 101 receives the password from the terminal device 120, and outputs to the data option output unit 103 (step A4). The data option output unit 103 makes access to the option table 31 of the option table storage unit 102, to thereby obtain at least one data identifier corresponding to the input password, and output to the terminal communication unit 101 (step A5) The terminal communication unit 101 transmits the at least one data identifier that has been input, to the terminal device 120 via the network 107 as an option (step A6).

The terminal device 120 outputs the option including the at least one identifier received via the communication unit 121 through the option presentation unit 125, for presentation to the user 10 of the robot (step A7). The user 10 of the robot selects the data identifier for the data that the user 10 wishes to incorporate into the robot out of the presented option of the data identifier, and the data selection acceptance unit 127 accepts the selected data identifier (step S8). The communication unit 121 of the terminal device 120 transmits the accepted data identifier to the server sub system 100 via the network 107, together with the password (step A9).

Then in the server sub system 100, the data identifier and the password are received through the terminal communication unit 101, and the password and the data identifier are output to the data selection unit 104 (step A10).

The step A10 in FIG. 12 is followed by FIG. 13, in which the data selection unit 104 of the server sub system 100 outputs the password and the data identifier to the data transmission unit 106 (step B1). The data transmission unit 106 makes access to the file table 33 of the data recording unit 105, to obtain a data file name corresponding to the data identifier (step B2). Then the data transmission unit 106 reads out the data under the obtained data file name from the data recording unit 105 (step B3).

Thereafter, the data transmission unit 106 transmits the password and the data to the robot sub system 110 (step B4). The data receiving unit 115 receives the password and the data from the server sub system 100 via the network 107, and outputs those to the data incorporation unit 116 (step B5).

Meanwhile, the password output by the password output unit 113 of the robot sub system 110 at the step A1 in FIG. 12 is stored in the password recording unit 114 as an issued password.

The data incorporation unit 116 receives the input of the password and the data from the data receiving unit 115, and makes access to the password recording unit 114 to examine whether the input password is matched with the issued password recorded in the password recording unit 114 (step B6). If affirmative, the data incorporation unit 116 incorporates the input data.

The effect of this embodiment will be described hereunder.

According to this embodiment, the timing to add new data to the robot is determined by the combination of the password output process (step A1 in FIG. 12) executed by the robot through the steps S31 to S39 in FIG. 7, and the password input process of step A2 in FIG. 12 executed by the user 10 of the robot. Such arrangement allows determining the timing to add new data to the robot with the involvement of both the means installed in the robot and the user 10 of the robot.

For example, adding new data each time the utilization time of the robot by the user 10 reaches a certain amount thus to increase the functions according to this embodiment can make the user 10 feel as if the robot were growing. In this case, the will of the user 10 to keep the robot from growing for such a reason that the user 10 loves the current state of the robot can be realized by refraining from executing the step A2 of FIG. 12 or postponing the execution thereof.

Also, this embodiment employs the process whereby the candidates of the data that may be incorporated into the robot is first determined through the process of the step A5 of FIG. 12 based on the password decided by the robot, and then the data to be incorporated into the robot is finally determined through the step A8 of FIG. 12 executed by the user 10 of the robot. Such arrangement allows determining the type of the data to be added to the robot with the involvement of both the means installed in the robot and the user 10 of the robot.

According to this embodiment, for example, adding new data each time the utilization time of the robot by the user 10 reaches a certain amount thus to increase the functions can make the user 10 feel as if the robot were growing. In this case, the data identifier including one or more variations for the growth is out put at the step A5 of FIG. 12, so that the user 10 can select the one he/she likes out of the variation, at the step A8 of FIG. 12.

As described above, the robot system according to the embodiment employs the process in which the data option is narrowed down with the password output by the robot sub system 110 and then the user 10 makes further selection, thereby enabling the selection of the data to be incorporated into the robot by the will of both the robot and the user 10. Further, the process in which the robot sub system 110 determines the timing to output the password from the password output unit 113 and the type of the password is combined with the process in which the user 10 of the robot inputs the selection of the type of the data through the terminal device 120 to the data selection unit 104 of the server sub system 100, which enables determining the timing to incorporate the data into the robot by the will of both the robot and the user 10.

Second Embodiment

Figure 14:
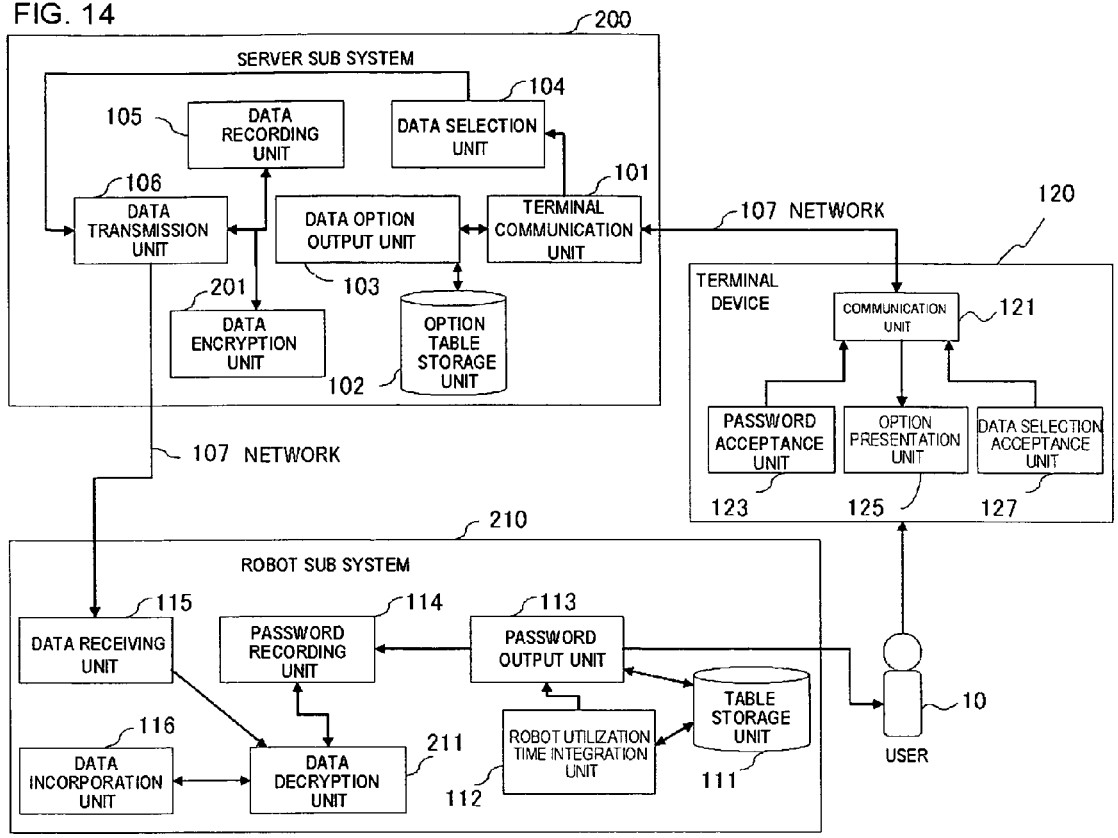
FIG. 14 is a schematic block diagram showing a configuration of an embodiment of a robot system according to the present invention.

FIG. 14 is a schematic block diagram showing a configuration of an embodiment of a robot system according to the present invention. The robot system according to this embodiment is different from the foregoing embodiment of FIG. 1 in that the server sub system 200 includes a data encryption unit 201, and the robot sub system 210 includes a data decryption unit 211.

In the server sub system 200, the data encryption unit 201 calculates an encryption key based on the password input from the data selection unit 104, encrypts the data, and delivers to the data transmission unit 106. The encrypted data is transmitted from the data transmission unit 106 to the robot sub system 210, and delivered to the data receiving unit 115.

In the robot sub system 210, the data decryption unit 211 generates a decryption key based on the issued password recorded in the password recording unit 114, and decrypts the data received by the data receiving unit 115 from the server sub system 200. The data decryption unit 211 deletes, upon successfully decrypting, the password used for the decryption from the password recording unit 114, and incorporates the decrypted data into the robot.

On the other hand, when the decryption ends up unsuccessful despite trying with all the passwords recorded in the password recording unit 114, it is decided that the decryption has failed and the received data is discarded. Here, in this embodiment, it is assumed that the password recording unit 114 has the function of outputting all the passwords recorded therein.

An operation of the robot system according to this embodiment will be described hereunder.

In the server sub system 200, firstly the data encryption unit 201 encrypts the data to be transmitted, with the encryption key calculated based on the password input from the data selection unit 104, and delivers the encrypted data to the data transmission unit 106. The data transmission unit 106 transmits the encrypted data to the robot sub system 210 via the network 107.

In the robot sub system 210, the data receiving unit 115 receives the encrypted data from the server sub system 200. The data decryption unit 211 generates the decryption key based on the password recorded in the password recording unit 114, to decrypt the received data. Upon successfully decrypting, the data decryption unit 211 incorporates the decrypted data into the robot, and deletes the password used for the decryption, from the password recording unit 114.

The effect of the best mode for carrying out the present invention will be described hereunder.

This embodiment allows transmitting the data encrypted by the key generated based on the password inaccessible by a third party, between the data transmission unit 106 of the server sub system 200 and the data receiving unit 115 of the robot sub system 210. This enables preventing incorporation of unauthorized data in the robot, unless the password leaks out to a third party by some means. For example, even when a system operated by a malicious third party exists on the network, such system can be kept from retrieving the data and the password being transmitted and removing the password, and then transmitting the data to the data receiving unit 115 in combination with unauthorized data, to thereby incorporate the unauthorized data into the robot.

Third Embodiment

Figure 15:
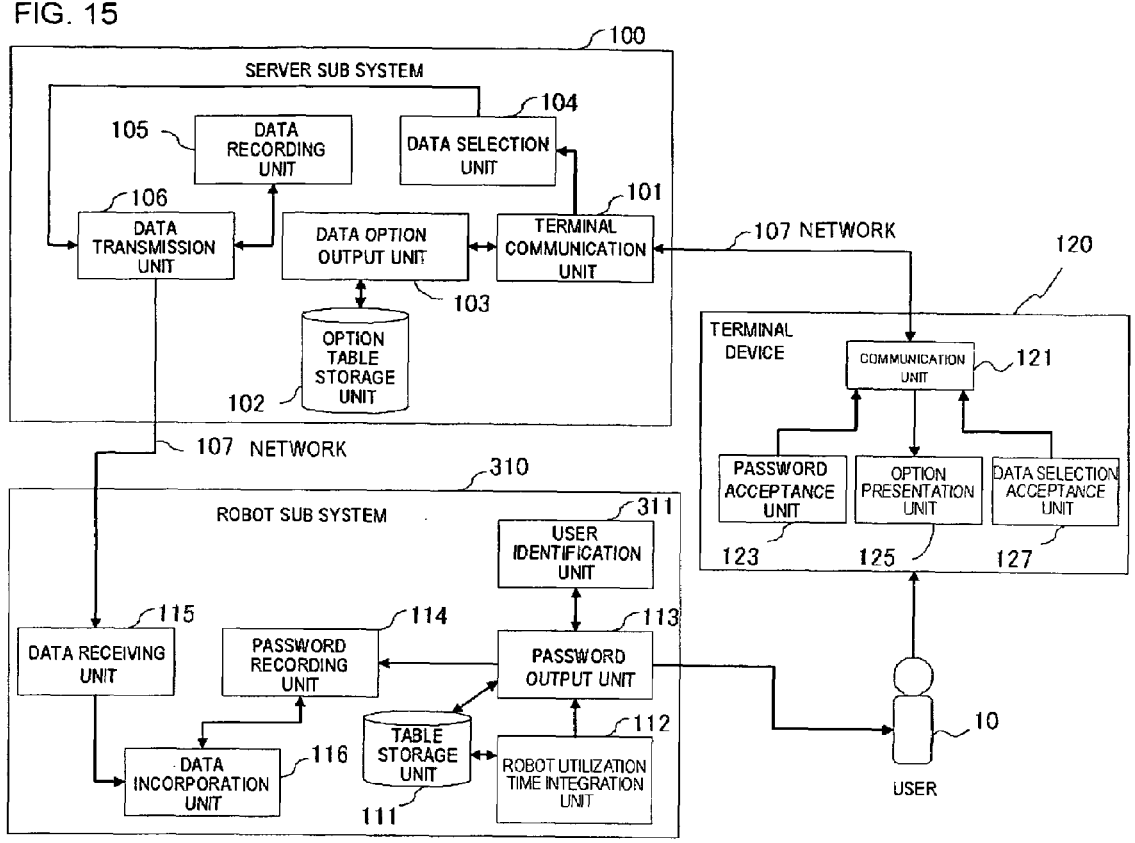
FIG. 15 is a schematic block diagram showing a configuration of an embodiment of a robot system according to the present invention.

FIG. 15 is a schematic block diagram showing a configuration of an embodiment of a robot system according to the present invention. The robot system according to this embodiment is different from the foregoing embodiment of FIG. 1 in that the robot sub system 310 includes a user identification unit 311.

The user identification unit 311 retains the identifier of at least one user authorized to receive the password, so as to identify the user 10 to whom the robot is currently about to output the password, and permits the output of the password if the identifier of the user 10 is included in the retained identifiers of users, but does not permit in the opposite case. The user authorized to receive the password is, for example, the user who is the owner of the robot or the user controlling the use of the robot.

An operation of the robot system according to this embodiment will be described hereunder.

In the robot sub system 310, the password output unit 113 obtains, prior to outputting the password, permission from the user identification unit 311 to output the password to the user 10. The password output unit 113 outputs the password only when the permission is granted.

In other words, the password output unit 113 identifies the user through the user identification unit 311 prior to outputting the password, and outputs the password after acquiring the permission to output.

The effect of this embodiment will be described hereunder.

According to this embodiment, the password is output after identifying the user 10 of the robot, and hence the user for whom the password may be output can be limited to users authorized in advance. Accordingly, although a guest of the owner or a family member of the owner of the robot may have a chance to be the user 10 of the robot, in addition to the owner of the robot, the robot can be prevented from outputting the password to those persons other than the owner, so as to output the password only to the specific user who is authorized to execute the process of adding the data to the robot.

Fourth Embodiment

Figures 16, 17:
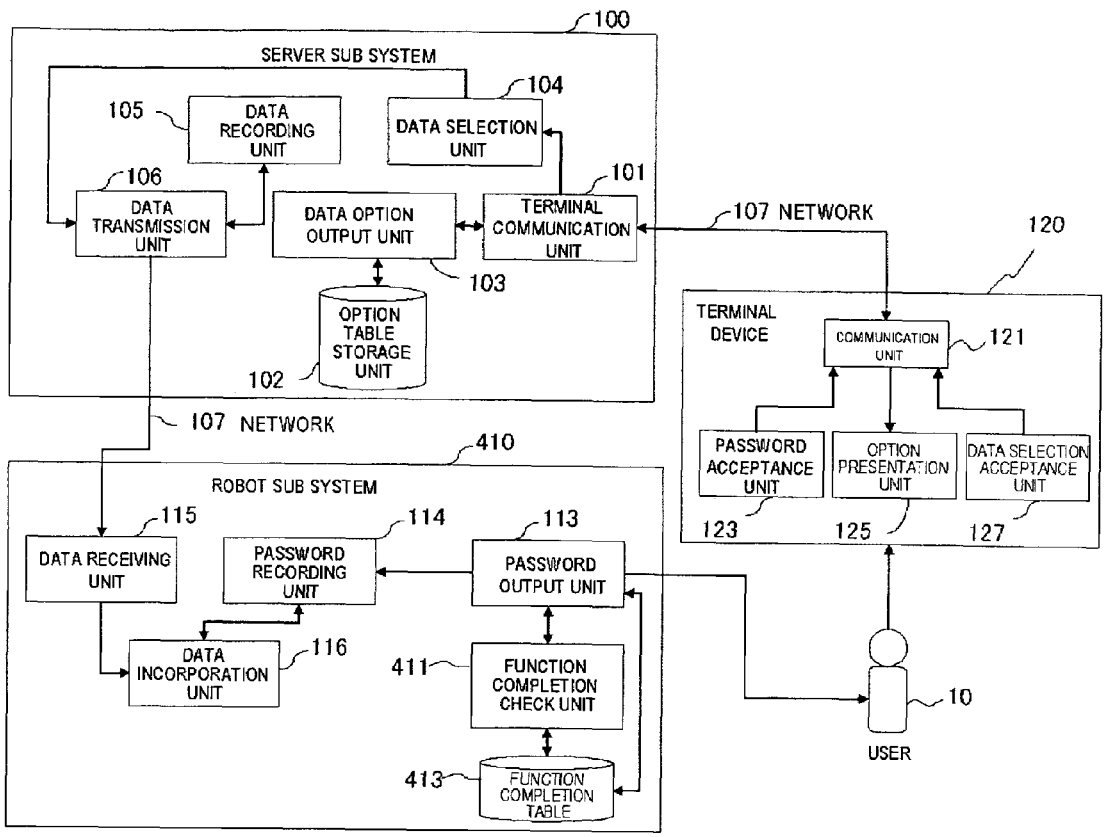
FIG. 16 is a schematic block diagram showing a configuration of an embodiment of a robot system according to the present invention.
FIG. 17 is a table showing an example of a data arrangement in a function completion table storage unit of a robot sub system shown in FIG. 16.

FIG. 16 is a schematic block diagram showing a configuration of an embodiment of a robot system according to the present invention. The robot system according to this embodiment is different from the foregoing embodiment of FIG. 1 in that the robot utilization time integration unit 112 is substituted in the robot sub system 410 with a function completion check unit 411 and a function completion table storage unit 413 (abbreviated as "function completion table" in the drawings).

The function completion check unit 411 monitors a specific function completion that takes place inside the robot. The function completion table storage unit 413 retains at least one correlation between a function and a password identifier to be output upon completion of the function. For example, as shown in FIG. 17, the function completion table storage unit 413 retains a parameter indicating completion of a function and a corresponding password identifier. The function completion check unit 411 outputs the corresponding password identifier to the password output unit 113, when the completion of the function included in the correlation in the function completion table storage unit 413 is confirmed. The functions the completion of which is monitored inside the robot include, for example, a game function played with the user, such that clearance of a predetermined achievement condition of the game is monitored through the function completion check unit 411 as completion of the function.

Here, the function completion table storage unit 413 also stores therein the password table 43 similar to that in the foregoing embodiment. In this embodiment, the timing that the password output unit 113 outputs the password, and the password to be output are determined by the decision unit, such as the function completion check unit 411, that decides whether the condition that permits the robot to accept the expansion data is satisfied.

An operation of the robot system according to this embodiment will be described hereunder.

The function completion check unit 411 monitors a specific function completion that takes place inside the robot, and retains at least one correlation between a function and a password identifier to be output upon completion of the function, so as to output the corresponding password identifier to the password output unit 113 when completion of a function included in the correlation is confirmed. The password output unit 113 makes access to the function completion table storage unit 413, to thereby obtain the password corresponding to the password identifier from the password table 43, and output the same.

Here, for example when the function, the completion of which is monitored inside the robot, is the game function played with the user, such that clearance of a predetermined achievement condition of the game is monitored through the function completion check unit 411 as completion of the function, data containing a new game contents may be transmitted from the data transmission unit 106 as a result of the clearance, thus to execute a process of adding the new game contents as an award of the clearance.

The effect of this embodiment will be described hereunder.

This embodiment allows executing a process of adding new data utilizing an arbitrary occurrence in the robot as a trigger.

Fifth Embodiment

Figures 18, 19:
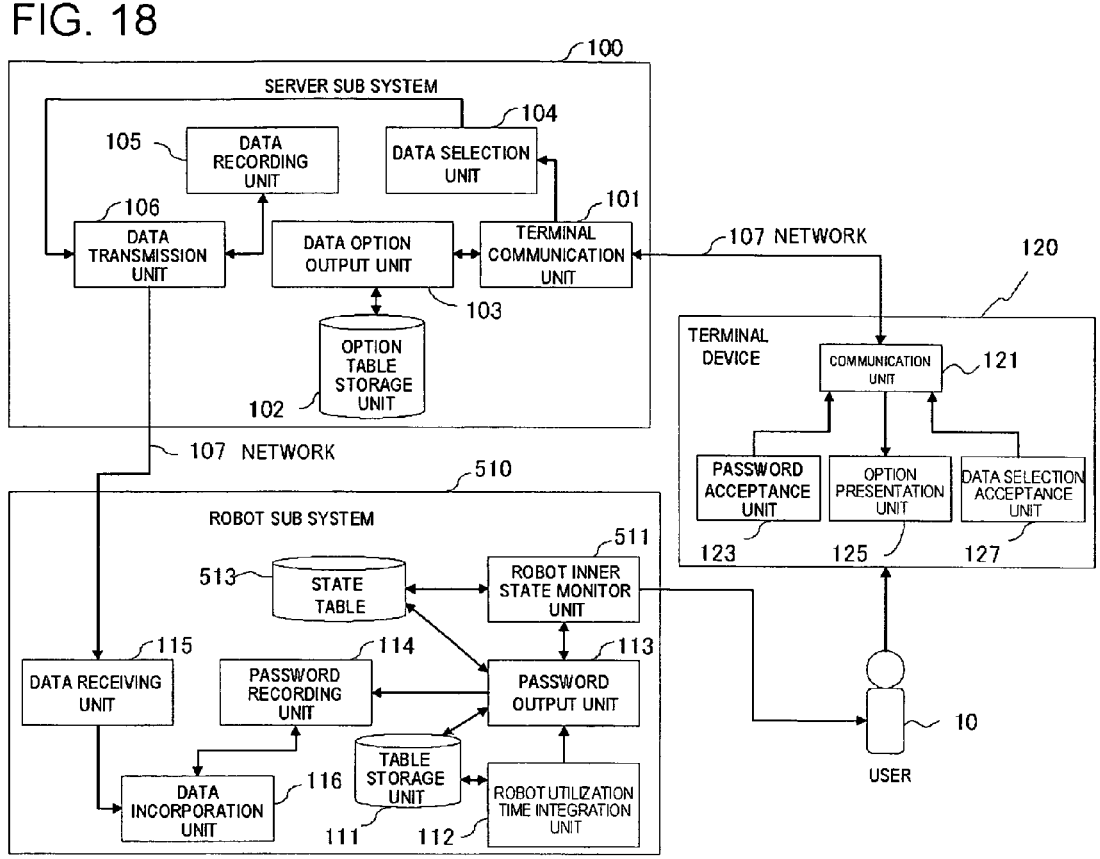
FIG. 18 is a schematic block diagram showing a configuration of an embodiment of a robot system according to the present invention.
FIG. 19 is a table showing an example of a data arrangement in the state table storage unit of the robot sub system shown in FIG. 18.

FIG. 18 is a schematic block diagram showing a configuration of an embodiment of a robot system according to the present invention. The robot system according to this embodiment is different from the foregoing embodiment of FIG. 1 in that the robot sub system 510 further includes a robot inner state monitor unit 511 and a state table storage unit 513 (abbreviated as "state table" in the drawings).

The robot inner state monitor unit 511 monitors the current state of the inner state of the robot. The state table storage unit 513 stores therein at least one inner state of the robot associated with the password identifier, and the corresponding password. As shown in FIG. 19, the state table storage unit 513 stores, for example, the password corresponding to each capacity value of the robot available for the data, associated with the password identifier. Thus, the inner states of the robot may include, for example, an emotional value simulated by the program installed in the robot, or a capacity value of the robot available for adding the data.

An operation of the robot according to this embodiment will be described hereunder.

The password output unit 113 has a function of obtaining the password from the identifier of the inner state of the robot and the password identifier, and receives the input of the current inner state of the robot from the robot inner state monitor unit 511, as well as the input of the password identifier from the robot utilization time integration unit 112, so as to obtain the corresponding password from the two identifiers, to output the obtained password to notify the user 10 of the robot, and to output the obtained password to the password recording unit 114 for recording. Thus, in this embodiment, the timing that the password output unit 113 outputs the password, and the password to be output are determined by the decision unit, such as the robot utilization time integration unit 112 or the robot inner state recording unit 511, that decides whether the condition that permits the robot to accept the expansion data is satisfied.

Alternatively, this embodiment may be configured such that the robot inner state monitor unit 511 retains at least one inner state of the robot, and the password output unit 113 obtains the password from the password identifier and the identifier of the at least one inner state.

The effect of the best mode for carrying out the present invention will be described hereunder.

In the foregoing embodiment, the password implies information on the utilization time of the robot, and may be utilized to incorporate into the robot the data suitable for the utilization time of the robot. In this embodiment, the password implies two types of information namely the utilization time of the robot and the inner state of the robot, and therefore data suitable for the two types of information may be incorporated into the robot with the password. For example, when utilizing the capacity value of the robot available for adding the data as the inner state of the robot, the data that can be accommodated in the robot from the viewpoint of the capacity may be selected out of a plurality of data suitable for the current utilization time, and incorporated into the robot.

EXAMPLE

Now, an operation of the best mode for carrying out the present invention will be described, referring to a specific example.

Figure 20:
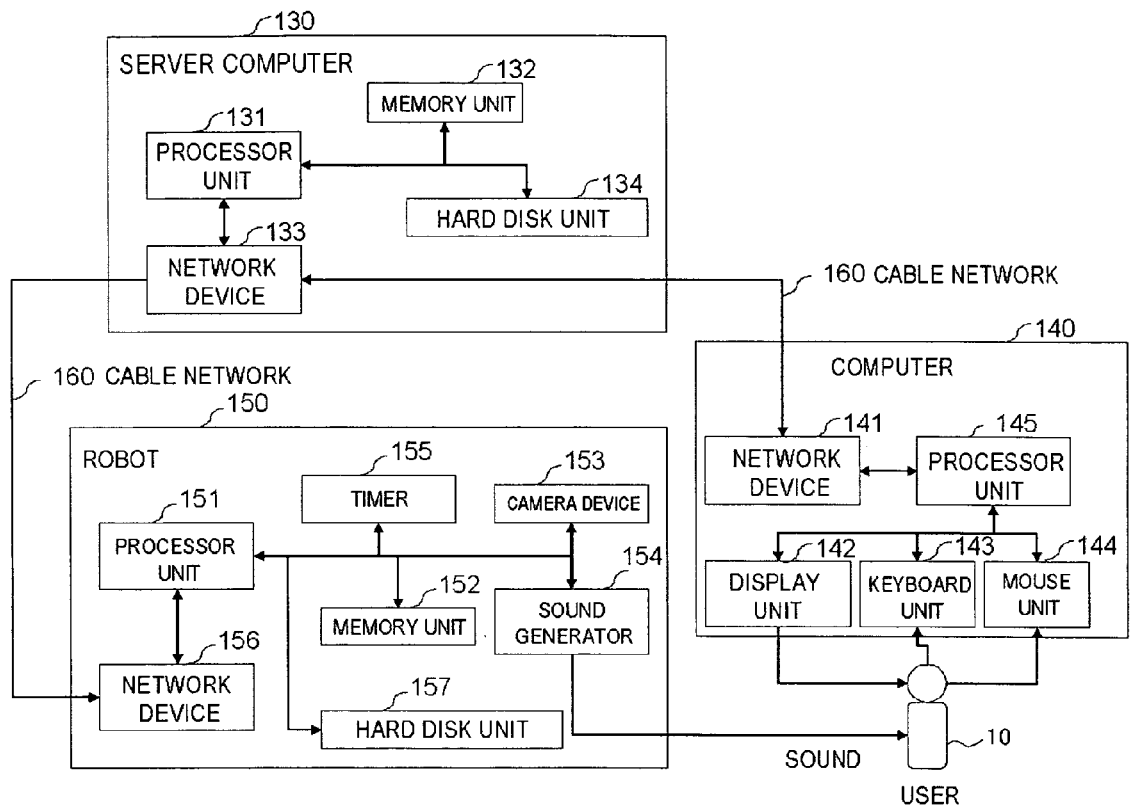
FIG. 20 is a schematic block diagram showing a hardware structure of a robot system in the embodiment.

A hardware structure for constituting the robot system according to the foregoing embodiments will be specifically described. FIG. 20 is a schematic block diagram showing a hardware structure of the robot system according to this example.

In this example, the robot system includes a server computer 130, a computer 140, and a robot 150. The server computer 130 corresponds to the server sub system 100 in FIG. 1, the computer 140 to the terminal device 120 in FIG. 1, and the robot 150 to the robot sub system 110 in FIG. 1.

The robot 150 includes therein at least one processor unit 151, a memory unit 152, a camera device 153, a sound generator 154, a timer 155, a network device 156, and a hard disk unit 157, or any optional one or more of those are disposed outside the robot 150, and connected thereto. The memory unit 152 may be substituted with the hard disk unit 157.

The processor unit 151 executes the program so as to control the respective constituents of the robot 150 and the entirety thereof, thereby embodying the respective constituents included in the robot sub system 110 shown in FIG. 1. Such program is stored in the memory unit 152. The camera device 153 shoots the face image of the user 10.

Although the sound generator 154 serves to audibly output the password to the user 10 of the robot, an image display unit may be employed instead, so as to notify the password to the user 10 with an image. Alternatively, a printer apparatus may be employed, so as to notify the password to the user 10 by a printout. Otherwise, an apparatus that writes letters with a writing material may be employed, in which case the password can be notified to the user 10 by writing the password on a paper with the writing material. Further, an apparatus that performs sign language or gesture may be employed, in which case the password can be notified to the user 10 by motion. Still further, a mail transmission unit may be employed, so as to transmit a mail containing a message notifying the password to a preregistered mail address. In this case, the terminal device 120 includes a mail receiving unit.

The server computer 130 includes therein at least one processor unit 131, a memory unit 132, a network device 133, and a hard disk unit 134, or any optional one or more of those are disposed outside the server computer 130, and connected thereto. The memory unit 132 may be substituted with the hard disk unit 134.

The processor unit 131 executes the program so as to control the respective constituents and the entirety of the server computer 130. The respective constituents of the server sub system 100 shown in FIG. 1 are embodied by the execution of the program, which is stored in the memory unit 132, to be executed by the processor unit 131.

The network device 133 is connected to a cable network 160, to thereby execute communication with the robot 150 and the computer 140, via the cable network 160.

The computer 140 includes a processor unit 145, and includes or is connected to a network device 141, a display unit 142, a keyboard unit 143, a mouse unit 144, or a similar input/output device, so that the user 10 of the robot may utilize those input/output devices to execute and operate the Web browser program, and make communication with the server computer 130. The terminal device 120 in FIG. 1 is embodied by the computer 140 that executes an existing Web browser program.

The cable network 160 corresponds to the network 107 in FIG. 1. A wireless network may be employed, instead of the cable network.

An operation of the robot system thus constructed will be described hereunder, contrasting FIG. 20 with FIGS. 1 through 19, thereby focusing on how the hardware structure of FIG. 20 embodies the robot system according to the foregoing embodiments shown in the respective drawings.

Firstly, the robot system according to the foregoing embodiment shown in FIG. 1 will be described. The robot utilization time integration unit 112 utilizes the timer 155 upon activation of the robot to obtain the starting time of the robot, and utilizes the timer 155 upon shutting down the robot to obtain the finishing time of the robot, to calculate the difference between the finishing time and the starting time thus to obtain the utilization time for that session, and adds to the robot utilization time integrated value located on the memory unit 152. Further, the robot utilization time integration unit 112 retains the state table 41 constituted of a data array including pairs of the utilization times and the password identifiers as shown in FIG. 5, on the memory unit 152. The unit of the utilization time shown in FIG. 5 is hours. For example, the first pair of data shown in FIG. 5 means that the password identifier of "stage 1" is output to the password output unit 113 when the robot utilization time integrated value located on the memory unit 152 exceeds two hours.

The password output unit 113 retains the password table 43 constituted of an array including pairs of the password identifiers and the passwords as shown in FIG. 6, on the memory unit 152, so as to obtain the password that constitutes a pair with the input password identifier, and outputs by vocalizing the letter row of the password through the sound generator 154, thus to notify to the user 10 of the robot. For example, when the password identifier of "stage 1" is input, an audible message of "The password is blue sky" or the like is announced to the user. Further, the password output unit 113 outputs the letter row of the password to the password recording unit 114, and records the same. The password recording unit 114 stores at least one password that has been input in the memory unit 152 or the hard disk unit 157.

Now, the robot system according to the embodiment shown in FIG. 18 will be described.

In the password output unit 113, the state table storage unit 513 arranged as shown in FIG. 19 is employed, unlike the other embodiments. Assuming that, for example, the remaining capacity of the memory unit or the hard disk unit 157 that accommodates the data is designated as the inner state, the program may be designed such that the robot inner state monitor unit 511 obtains the remaining capacity of those units from the operating system controlling those units, and outputs to the password output unit 113 as "scarce" when the remaining capacity is less than a predetermined capacity value, and as "sufficient" in the opposite case. In this example, the capacity for the data is employed as the inner state of the robot. Also, the state of the capacity is expressed by a binary value of "sufficient" and "scarce". For example, when the password identifier of "stage 1" is input and the identifier of the inner state is "scarce", the password of "dark night" is selected, so that an audible message of "The password is dark night" or the like is announced to the user.

The terminal communication unit 101 is embodied by an existing Web server program and a display data describing the display structure in html language. The Web server program transmits a first display data to the terminal device 120. The first display data displays an image such as the password input screen 51 shown in FIG. 9 on the screen of the display unit 142. The user 10 of the robot manipulates the keyboard unit 143 and the mouse unit 144 to input the password obtained from the password output unit 113 in the password input column 52 below the sign saying "Input password", and clicks on the button marked as "OK". As a result, the input password is transmitted, and output to the data option output unit 103 through the terminal communication unit 101.

The option table storage unit 102 retains the option table 31 constituted of an array of data including pairs of the passwords and the data identifiers. The data option output unit 103 utilizes the input password to retrieve the data from the option table 31 in the option table storage unit 102, and obtains at least one corresponding data identifier. It is assumed, for example, that the data identifiers corresponding to the password of "white cloud" are "stage 2 dance scenario", "stage 2 talk scenario", and "stage 2 game scenario". The data option output unit 103 produces a second display data such as the data selection screen 53 shown in FIG. 10, based on the at least one data identifier obtained. The second display data is output to the terminal communication unit 101, and then displayed on the screen of the display unit 142 via the network 107. The user 10 of the robot manipulates the keyboard unit 143 and the mouse unit 144 to select one of the data identifiers being displayed. The selected data identifier is output to the terminal communication unit 101 via the network 107. The terminal communication unit 101 outputs the selected data identifier and the password to the data selection unit 104.

The data recording unit 105 retains the file table 33 constituted of an array of data including pairs of the data identifiers as shown in FIG. 3 and the data designating a location to actually store the data such as the file name. The storage location of the data corresponds to the data recording unit 105. The data recording unit 105 is constituted of a device capable of retaining a file, such as the hard disk unit 134. The data selection unit 104 makes access to the file table 33 of the data recording unit 105 to obtain the storage location of the data that constitutes a pair with the input data identifier, and outputs the expansion location of the data and the password to the data transmission unit 106.

The data transmission unit 106 receives the input of the data from the data recording unit 105 based on the storage location of the data, and transmits the data, together with the input password, to the data receiving unit 115 via the network 107.

The data receiving unit 115 outputs the received data and the password to the data incorporation unit 116. The data incorporation unit 116 examines whether the input password is included in one or more passwords retained by the password recording unit 114. In the affirmative case, the input data is incorporated into the robot. In the opposite case, no action is performed. The job of incorporating the data into the robot is actually carried out by adding the input data to the data stored in the memory unit 152 for controlling the performance of the robot.

Now, the robot system according to the foregoing embodiment shown in FIG. 14 will be described. Here, the data encryption unit 201 and the data decryption unit 211 employ a secret key cryptosystem popularly known, as the method of encryption. The data encryption unit 201 generates the encryption key utilizing the password referred to in the present invention as the key, so as to encrypt the data with such encryption key. The data decryption unit 211 generates the decryption key utilizing the password referred to in the present invention as the key, so as to decrypt the data with such decryption key.

Hereunder, the robot system according to the foregoing embodiment shown in FIG. 15 will be described. The user identification unit 311 may be embodied through such process as recognizing the face image of the user with the camera device 153 installed inside the robot, and issuing permission to output the password when it is confirmed that a specific user is in front of the camera device 153 through comparison with the preregistered face image of the user. The method of identifying the user by recognizing the face image is disclosed in the foregoing patented document 1. Alternative methods to embody the user identification unit 311 include detecting a radio wave emitted by a portable apparatus of the specific user, identifying the voice print of the user, and personally asking the user such as "Who are you?" to obtain a response, and so forth.

Otherwise, in another embodiment, the password output unit 113 may output a different password according to the user identified by the user identification unit 311. The table storage unit 111 stores a plurality of state tables 41, and possesses a user table on which the user and the state table 41 are associated. The state table 41 corresponding to the user identified by the user identification unit 311 is obtained from the user table, and the password is obtained with the corresponding state table 41. Such arrangement enables adding a different function for each user. Thus, the timing that the password output unit 113 outputs the password, and the password to be output are determined by the decision unit, such as the robot utilization time integration unit 112 or the user identification unit 311, that decides whether the condition that permits the robot to accept the expansion data is satisfied.

The robot system according to the foregoing embodiment shown in FIG. 16 will now be described. The function completion check unit 411 may be embodied as a program of monitoring at a certain interval in time specific locations in the memory unit 152 installed inside the robot, designated by a format such as a parameter name. It is assumed that, when a specific function is completed in the robot the value of the specific location in the memory unit 152 is modified by that function. The function completion check unit 411 may be configured so as to retain an array including pairs of the names of parameters indicating the specific locations and the password identifiers, as shown in FIG. 17, and to output, when the value of the specific location is modified, the password identifier corresponding thereto to the password output unit 113.

Although the embodiments of the present invention have been described above referring to the drawings, it is to be understood that they are only exemplary, and that various other structures may be adopted.

For example, although the function completion check unit 411 serves to monitor completion of a specific function in the foregoing embodiments, a different arrangement may be adopted. In another embodiment, the function completion check unit 411 may parallelly monitor completion of a plurality of different functions. The robot sub system 410 may include the function completion tables for each of the plurality of functions, so that the function completion check unit 411 may monitor each completion of utilization of the plurality of functions that takes place in the robot sub system 410, identify the type of the function the completion of utilization of which has been confirmed, and make access to the function completion table corresponding to the function of the identified type. Such arrangement enables monitoring the completion of utilization of the function with respect to each of the plurality of functions of the robot sub system 410, and outputting different passwords.

In addition, the following structures may also be employed as embodiments of the present invention.

(1) A method of controlling a data structure of an apparatus capable of modifying a function by modifying data contained in the apparatus, comprising a password output unit that outputs a password used for presenting limited expansion data to be incorporated into the apparatus to the user for selection by the user.

(2) The method of controlling a data structure, wherein the password output unit according to (1) outputs one password selected out of one or more passwords based on a utilization time of the apparatus.

(3) The method of controlling a data structure, wherein the password output unit according to (1) outputs one password selected out of one or more passwords based on the utilization time of the apparatus and one or more inner states of the apparatus.

(4) The method of controlling a data structure according to (2) and (3), wherein the password output unit outputs a password after the utilization time of the apparatus exceeds a predetermined time.

(5) The method of controlling a data structure, wherein the password output unit according to (1) outputs a password triggered by completion of utilization of one or more functions installed in the apparatus.

(6) The method of controlling a data structure according to (5), wherein the password output unit outputs one password selected out of one or more passwords based on a type of one or more functions the utilization of which is completed.

(7) The method of controlling a data structure according to (5), wherein the password output unit outputs one password selected out of one or more passwords based on a type of one or more functions the utilization of which is completed, and one or more inner states of the apparatus.

(8) The method of controlling a data structure according to any of (1) to (7), comprising a data incorporation unit that executes a process of recording the password output to the user by the password output unit, inputting data, and incorporating the data as expansion data of the apparatus only when the input data includes the same password.

(9) The method of controlling a data structure according to any of (1) to (7), comprising a data incorporation unit that executes a process of recording the password output to the user by the password output unit, inputting data, and incorporating the data as expansion data of the apparatus only when the input data can be decrypted by a decryption key constituted of the same password.

(10) The method of controlling a data structure according to (1), comprising a user identification unit that identifies a current user of the apparatus, wherein the password output unit outputs the password to the user only when it is confirmed by the user identification unit that a predetermined user is utilizing the apparatus.

(11) A method of controlling a data structure of an information processing apparatus connected via a network to an apparatus capable of modifying an operation by modifying data contained in the apparatus, comprising: a data selection unit that executes a process of allowing a user to input a password, selecting one or more expansion data to be incorporated into the apparatus based on the password input by the user, allowing the user to input a designation out of the selected expansion data; and a data transmission unit that transmits the selected expansion data to the apparatus via the network.

(12) The method of controlling a data structure, wherein the data transmission unit according to (11) includes the password input by the data selection unit in the expansion data when transmitting the expansion data to the apparatus.

(13) The method of controlling a data structure, wherein the data transmission unit according to (11) transmits to the apparatus the expansion data encrypted by an encryption key constituted of the password input by the data selection unit.

(14) The method of controlling a data structure, wherein the data selection unit according to (11) receives an input of the password output by the password output unit according to any of (1) to (7).

(15) The method of controlling a data structure, wherein the data transmitted by the data transmission unit according to (12) is input by the data incorporation unit according to (8).

(16) The method of controlling a data structure, wherein the data transmitted by the data transmission unit according to (13) is input by the data incorporation unit according to (9).

(17) The method of controlling a data structure, comprising: allowing the data selection unit according to (11) to input the password output by the password output unit according to any of (1) to (7); and allowing the data incorporation unit according to (8) to input the data transmitted by the data transmission unit according to (12).

(18) The method of controlling a data structure, comprising: allowing the data selection unit according to (11) to indirectly input the password output by the password output unit according to any of (1) to (7); and allowing the data incorporation unit according to (9) to input the data transmitted by the data transmission unit according to (13).

(19) A robot apparatus including a rewritable storage unit, further including one or more of a sound generator and an image display unit, and capable of performing different actions by adding data to a specific location in the storage unit, wherein a password used for selecting the data to be added to the storage unit is notified to a user of the robot apparatus with one or more of the sound generator and the image display unit.

(20) The robot apparatus according to (19), wherein one password to be notified to the user is selected out of one or more passwords based on a utilization time of the robot apparatus.

(21) The robot apparatus according to (19), wherein one password to be notified to the user is selected out of one or more passwords based on a utilization time of the robot apparatus, and one or more inner states in the robot apparatus.

(22) The robot apparatus according to (20) or (21) wherein the password is notified to the user after the utilization time of the robot apparatus exceeds a predetermined time.

(23) The robot apparatus according to (19), wherein the password is notified with the completion of utilization of one or more functions installed in the robot apparatus as a trigger.

(24) The robot apparatus according to (23), wherein one password is selected out of one or more passwords, based on a type of one or more functions incorporated into the robot apparatus and the utilization of which is completed, and is notified.

(25). The robot apparatus according to (23), wherein one password is selected out of one or more passwords, based on a type of one or more functions incorporated into the robot apparatus and the utilization of which is completed, and based on one or more inner states of the robot apparatus, and is notified.

(26) The robot apparatus according to any of (19) to (25), comprising a data incorporation unit that executes a process of recording the password notified to the user in the storage unit, inputting data in the storage unit, and adding the data to a specific location in the storage unit, only when the input data includes the same password.

(27) The robot apparatus according to any of (19) to (25), comprising a data incorporation unit that executes a process of recording the password notified to the user in the storage unit, inputting data in the storage unit, and adding the data to a specific location in the storage unit, only when the input data can be decrypted by a decryption key constituted of the same password.

(28) The robot apparatus according to any of (19) to (25), comprising an image input device, wherein image information of a user authorized to receive the password is recorded in the storage unit; an image of a user present close to the robot apparatus is input through the image input device; and the password is notified to the user when the input image is matched with the image information in the storage unit upon comparison of the same.

(29) A server connected via a network to the robot apparatus according to (19) and a terminal device operated by a user of the robot apparatus, comprising an input unit that receives an input of a password input by the user through the terminal device; a selection unit that selects based on the input password one or more expansion data to be incorporated into the robot apparatus; a data selection unit that executes a process of inputting a designation out of the selected expansion data through the terminal device operated by the user; and a data transmission unit that transmits the selected expansion data to the robot apparatus via the network.

(30) The server according to (29), wherein the data transmission unit includes the password input by the data selection unit in the expansion data, when transmitting the expansion data to the robot apparatus.

(31) The server according to (29), wherein the data transmission unit transmits to the robot apparatus the expansion data encrypted by an encryption key constituted of the password input by the data selection unit.

(32) The server, wherein the password input by the data selection unit according to (29) is the password notified to the user by the robot apparatus according to any of (19) to (25).

(33) A robot system, wherein the robot apparatus according to (26) inputs the data transmitted by the server according to (30).

(34) A robot system, wherein the robot apparatus according to (27) inputs the data transmitted by the server according to (31).

(35) A robot system that executes a process of allowing the server according to (30) to input the password notified to the user by the robot apparatus according to (26), and allowing the robot apparatus according to (26) to input the data transmitted by the server according to (30).

(36) A robot system that executes a process of allowing the server according to (31) to input the password notified to the user by the robot apparatus according to (27), and allowing the robot apparatus according to (27) to input the data transmitted by the server according to (31).

The invention claimed is:

1. A data update system comprising:
   an apparatus that executes a program of performing a predetermined function; and
   a data supply device connected to said apparatus via a network, that possesses a plurality of expansion data that expands a function of said apparatus and transmits said expansion data to said apparatus;
   wherein said apparatus includes:
   a data storage unit that stores said program;
   a receiving unit that receives said expansion data for expanding said function from said data supply device;
   an update unit that stores said expansion data received by said receiving unit in said data storage unit, thus to add a new program or update said program;
   a decision unit that decides whether a condition that permits accepting said expansion data is satisfied;
   a password storage unit that stores a password associated with said plurality of expansion data acquirable under each said condition, to be used when receiving said expansion data from said data supply device; and
   a password output unit that makes access to said password storage unit and obtains said password for said expansion data corresponding to said decided condition, to output said obtained password to a user; and
   said data supply device includes:
   a table storage unit that stores a table in which said plurality of expansion data and said password are associated;
   a password acceptance unit that accepts an input of said password by said user;
   a presentation unit that makes access to said table storage unit, to thereby obtain said plurality of expansion data corresponding to said password accepted by said password acceptance unit and present said expansion data to said user;
   a selection acceptance unit that accepts said expansion data selected by said user out of said plurality of expansion data presented by said presentation unit; and
   a transmission unit that reads out said expansion data accepted by said selection acceptance unit from said expansion data storage unit, and transmits said expansion data together with said password to said apparatus via said network.

2. The data update system according to claim 1,
   wherein said apparatus includes an issued password storage unit that stores said password output by said password output unit;
   said transmission unit of said data supply device transmits said password accepted by said password acceptance unit together with said expansion data;
   said receiving unit of said apparatus receives said password from said data supply device together with said expansion data;
   said update unit of said apparatus makes access to said issued password storage unit, and stores said expansion data received by said receiving unit in said data storage unit, when said password received by said receiving unit is stored in said issued password storage unit, thus to add a new program or update said program.

3. The data update system according to claim 1, comprising:
   a time table storage unit that stores at least one password corresponding to a utilization time of said apparatus; and
   a timer that measures said utilization time of said apparatus;

wherein said password output unit makes access to said time table storage unit to obtain said at least one password corresponding to said utilization time of said apparatus measured by said timer, and outputs said password.

4. The data update system according to claim 1, wherein said apparatus includes:
a state table that contains at least an inner state of said apparatus associated with said password, and
a state monitor unit that monitors said inner state of said apparatus; and
said password output unit makes access to said state table to obtain said password corresponding to said inner state of said apparatus monitored by said state monitor unit, and outputs said password.

5. The data update system according to claim 1, wherein said data supply device includes:
an encryption key calculation unit that calculates an encryption key based on said password accepted by said password acceptance unit, and
an encryption unit that reads out and encrypts said expansion data accepted by said the selection acceptance unit from said data storage unit with said encryption key calculated by said encryption key calculation unit;
said transmission unit of said data supply device transmits said expansion data encrypted by said encryption unit to said apparatus via said network;
said apparatus includes:
a decryption key calculation unit that calculates a decryption key based on said password stored in said issued password storage unit, and
a decryption unit that decrypts said expansion data received by said receiving unit with said decryption key calculated by said decryption key calculation unit; and
said update unit of said apparatus stores said expansion data decrypted by said decryption unit in said data storage unit, thus to add a new program or update said program.

6. The data update system according to claim 1, wherein said apparatus includes:
an identification unit that identifies a user,
a registered member table on which a user authorized to receive a password is registered, and
a judgment unit that makes access to said registered member table to judge whether said user identified by said identification unit is included in said registered member table; and
said password output unit of said apparatus outputs said password when said judgment unit judges that said user is included in said registered member table.

7. The data update system according to claim 1, wherein said apparatus includes:
a function completion table that contains a parameter indicating completion of utilization of a specific function generated in said apparatus in correlation with said password output when said utilization of said specific function is completed, and
a function completion check unit that makes access to said function completion table to monitor said completion of utilization of said specific function generated in said apparatus, and obtains said corresponding password when said completion of utilization is confirmed; and
said password output unit of said apparatus outputs said password obtained by said function completion check unit.

8. The data update system according to claim 7, wherein said apparatus includes said function completion table for each type of said plurality of functions; and said function completion check unit monitors completion of utilization of each of said plurality of functions performed in said apparatus, identifies a type of said function the utilization of which is confirmed to have been completed, and makes access to said function completion table corresponding to said identified type of said function.

9. The data update system according to claim 1, comprising:
a terminal device connected to said external apparatus via said network, including:
an acceptance unit that accepts an input of said password or selection of said expansion data, and
a transmission unit that transmits said input password or said selected expansion data accepted by said acceptance unit to said external apparatus via a network;
wherein said data supply device includes a receiving unit that receives via said network said input password or said selected expansion data transmitted by said terminal device;
said password acceptance unit of said data supply device accepts an input of said password received by said receiving unit; and
said selection acceptance unit of said data supply device accepts said selection of said expansion data received by said receiving unit.

10. The data update system according to claim 9, wherein said presentation unit of said data supply device includes an instruction unit that instructs a screen display of said plurality of expansion data to said terminal device via said network; and
said terminal device includes:
an instruction acceptance unit that accepts via said network an instruction to display said screen from said instruction unit of said data supply device, and
a display unit that displays said screen presenting said plurality of expansion data according to said instruction to display said screen accepted by said instruction acceptance unit.

11. A robot apparatus comprising:
a data storage unit that stores a program of performing a predetermined function;
an execution unit that executes said program;
a communication unit including at least one of a sound generator and an image display unit;
an update unit that stores expansion data received by said receiving unit in said data storage unit thus to add a new program or modify said program;
a decision unit that decides whether a condition that permits accepting said expansion data is satisfied;
a password storage unit that stores a password associated with a plurality of said expansion data acquirable under each such condition, to be used when receiving said expansion data from a data supply device; and a password acquisition unit that makes access to said password storage unit and obtains said password for said expansion data corresponding to said decided condition;
wherein said password obtained by said password acquisition unit is output to a user via said communication unit;
a receiving unit that receives said expansion data together with said password that expands said predetermined function from said data supply device.

12. The robot apparatus according to claim 11, comprising:
an issued password storage unit that stores said password obtained by said password acquisition unit;

wherein said transmission unit of said data supply device transmits said password accepted by said password acceptance unit together with said expansion data;

said receiving unit receives said password from said data supply device together with said expansion data; and said update unit makes access to said issued password storage unit, and stores said expansion data received by said receiving unit in said data storage unit, when said password received by said receiving unit is stored in said issued password storage unit, thus to add a new program or update said program.

13. The robot apparatus according to claim 11, comprising:

a time table storage unit that stores at least one password corresponding to a utilization time of said robot apparatus, and a timer that measures said utilization time of said apparatus;

wherein said password acquisition unit makes access to said time table storage unit to obtain said at least one password corresponding to said utilization time of said apparatus measured by said timer, and outputs said password.

14. The robot apparatus according to claim 11, comprising:

a state table that contains at least an inner state of said robot apparatus associated with said password; and a state monitor unit that monitors said inner state of said robot apparatus;

wherein said password acquisition unit makes access to said state table to obtain said password corresponding to said inner state of said robot apparatus monitored by said state monitor unit.

15. The robot apparatus according to claim 11, comprising:

a decryption key calculation unit that calculates a decryption key based on said password stored in said issued password storage unit; and a decryption unit that decrypts said expansion data received by said receiving unit with said decryption key calculated by said decryption key calculation unit;

wherein said update unit stores said expansion data decrypted by said decryption unit in said data storage unit, thus to add a new program or update said program.

16. The robot apparatus according to claim 11, comprising:

an identification unit that identifies a user;

a registered member table on which a user authorized to receive a password is registered; and a judgment unit that makes access to said registered member table to judge whether said user identified by said identification unit is included in said registered member table;

wherein said password acquisition unit obtains said password when said judgment unit judges that said user is included in said registered member table.

17. The robot apparatus according to claim 16, comprising:

a user image recording unit that records first image information of said user registered in said registered member table;

wherein said identification unit includes an imaging unit that images of said user;

said judgment unit compares second image information of said user imaged by said imaging unit with said image information stored in said user image recording unit, thus to judge whether those image information are matched with each other; and said password acquisition unit obtains said password when said comparison unit judges that those image information are matched with each other.

18. The robot apparatus according to claim 11, comprising:

a function completion table that contains a parameter indicating completion of utilization of a specific function generated in said robot apparatus in correlation with said password output when said utilization of said specific function is completed; and a function completion check unit that makes access to said function completion table to monitor said completion of utilization of said specific function generated in said apparatus, and obtains said corresponding password when said completion of utilization is confirmed;

wherein said password acquisition unit outputs said password obtained by said function completion check unit.

19. The robot apparatus according to claim 18, comprising:

said function completion table for each type of said plurality of functions;

wherein said function completion check unit monitors completion of utilization of each of said plurality of functions performed in said robot apparatus, identifies a type of said function the utilization of which is confirmed to have been completed, and makes access to said function completion table corresponding to said function of said identified type.

20. A data supply device comprising:

a connector for connection via a network to an apparatus that executes a program of performing a predetermined function;

an expansion data storage unit that stores a plurality of expansion data that expands a function of said apparatus;

a table storage unit that stores a table on which said plurality of expansion data and said password are associated with each other;

a password acceptance unit that accepts an input of said password by a user;

a presentation unit that makes access to said table storage unit to obtain said plurality of expansion data corresponding to said password accepted by said password acceptance unit, and presents said expansion data to said user;

a selection acceptance unit that accepts said expansion data selected by said user out of said plurality of expansion data presented by said presentation unit; and a transmission unit that reads out said expansion data accepted by said selection acceptance unit from said expansion data storage unit, and transmits said expansion data together with said password to said apparatus via said network.

21. A data update method of controlling a data structure of an apparatus by transmitting, via a network, expansion data from a data supply device including an expansion data storage unit that stores a plurality of expansion data, to said apparatus including a data storage unit that stores a program that performs a predetermined function and an execution unit that executes said program, comprising:

deciding, in said apparatus including a password storage unit that stores a password, associated with said plurality of expansion data acquirable under each condition that permits accepting said expansion data and to be used when receiving said expansion data from said data supply device, whether said condition is satisfied;

making access to said password storage unit and obtaining said password for said expansion data corresponding to said decided condition; and outputting to a user said password obtained at said step of obtaining said password;

in said data supply device including a table storage unit that stores a table on which said plurality of expansion data and said password are associated with each other;
accepting an input of said password by said user;
making access to said table storage unit and obtaining said plurality of expansion data corresponding to said password accepted by said password acceptance unit;
presenting said plurality of expansion data to said user;
accepting said expansion data selected by said user out of said presented plurality of expansion data; and
reading out said accepted expansion data from said expansion data storage unit, and transmitting said expansion data to said apparatus via said network;
receiving, in said apparatus, said expansion data together with said password that expands said function from said data supply device; and
storing said received expansion data in said data storage unit, thus adding a new program or updating said program.

22. A robot system comprising:
a robot apparatus that executes a program of performing a predetermined function; and
a data supply device connected to said robot apparatus via a network, that possesses a plurality of expansion data that expands a function of said robot apparatus and transmits said expansion data to said robot apparatus;
wherein said robot apparatus includes:
a data storage unit that stores a program of performing a predetermined function;
an execution unit that executes said program;
a communication unit including at least one of a sound generator and an image display unit;
a receiving unit that receives expansion data that expands said function from a data supply device;
an update unit that stores said expansion data received by said receiving unit in said data storage unit thus to add a new program or update said program;
a decision unit that decides whether a condition that permits accepting said expansion data is satisfied;
a password storage unit that stores a password associated with said plurality of expansion data acquirable under each such condition, to be used when receiving said expansion data from said data supply device;
a password acquisition unit that makes access to said password storage unit and obtains said password for said expansion data corresponding to said decided condition; and
a password output unit that outputs said password obtained by said password acquisition unit to said user via said communication unit; and
said data supply device includes:
a table storage unit that stores a table on which said plurality of expansion data and said password are associated with each other;
a password acceptance unit that accepts an input of said password by a user;
a presentation unit that makes access to said table storage unit to obtain said plurality of expansion data corresponding to said password accepted by said password acceptance unit, and presents said expansion data to said user;
a selection acceptance unit that accepts said expansion data selected by said user out of said plurality of expansion data presented by said presentation unit; and
a transmission unit that reads out said expansion data accepted by said selection acceptance unit from said expansion data storage unit, and transmits said expansion data together with said password to said robot apparatus via said network.

23. A data update program for updating data of an apparatus by transmitting, via a network, expansion data from a data supply device possessing a plurality of expansion data that expands a function of said apparatus, to said apparatus including a data storage unit that stores a program that performs a predetermined function and an execution unit that executes said program,
said data update program including:
a program that allows said apparatus including a password storage unit that stores a password, associated with said plurality of expansion data acquirable under each condition that permits accepting said expansion data and to be used when receiving said expansion data from said data supply device, to execute steps of:
deciding whether said condition is satisfied;
making access to said password storage unit to obtain said password for said expansion data corresponding to said decided condition; and
outputting to a user said password obtained in the obtaining step,
a program that allows said data supply device including a table storage unit that stores a table on which said plurality of expansion data and said password are associated, to execute steps of:
accepting an input of said password by said user;
making access to said table storage unit to obtain said plurality of expansion data corresponding to said password accepted in the accepting step;
presenting said plurality of expansion data to said user;
accepting said expansion data selected by said user out of said presented plurality of expansion data; and
reading out said accepted expansion data from said expansion data storage unit, to transmit said expansion data together with said password to said apparatus via said network, and
a program that allows said apparatus to execute steps of:
receiving said expansion data that expands said function from said data supply device; and
storing said received expansion data in said data storage unit, thus to add a new program or update said program.

* * * * *